(12) United States Patent
Anderson et al.

(10) Patent No.: US 6,597,691 B1
(45) Date of Patent: Jul. 22, 2003

(54) HIGH PERFORMANCE SWITCHING

(75) Inventors: Terry M. Anderson, Minnetonka, MN (US); William R. George, Minnetonka, MN (US)

(73) Assignee: Ancor Communications, Inc., Eden Prairie, MN (US)

( * ) Notice: Subject to any disclaimer, the term of this patent is extended or adjusted under 35 U.S.C. 154(b) by 0 days.

(21) Appl. No.: 09/386,109

(22) Filed: Aug. 30, 1999

Related U.S. Application Data

(60) Provisional application No. 60/098,742, filed on Sep. 1, 1998.

(51) Int. Cl.[7] ............................ H04L 12/50; H04Q 11/00
(52) U.S. Cl. ..................................... 370/360; 370/367
(58) Field of Search .......................... 370/360, 380, 370/389, 369, 357, 375, 386, 387, 388

(56) References Cited

U.S. PATENT DOCUMENTS

| | | | | |
|---|---|---|---|---|
| 6,021,128 A | * | 2/2000 | Hosoya | 370/380 |
| 6,128,292 A | * | 10/2000 | Kim | 370/356 |
| 6,160,813 A | * | 12/2000 | Banks | 370/422 |
| 6,324,181 B1 | * | 11/2001 | Wong | 370/403 |
| 6,330,236 B1 | * | 12/2001 | Ofek | 370/369 |
| 2001/0038628 A1 | * | 11/2001 | Ofek | 370/392 |

* cited by examiner

Primary Examiner—Ajit Patel
Assistant Examiner—Chirag Shah
(74) Attorney, Agent, or Firm—Schwegman, Lundberg, Woessner & Kluth, P.A.

(57) ABSTRACT

High performance switching network topologies and frame addressing techniques therefor are disclosed. A two-dimensional Fiber Channel switch fabric is disclosed which combines a Class 1 connection space-division multiplexing sub-fabric, and Class 2 and 3 connectionless space- and time-division multiplexing sub-fabric. Networking topologies are disclosed for combining multiple modules to increase the number of supported ports. Addressing and frame routing techniques are provided for routing frames to any port in any module of a large interconnected network of modules.

18 Claims, 15 Drawing Sheets

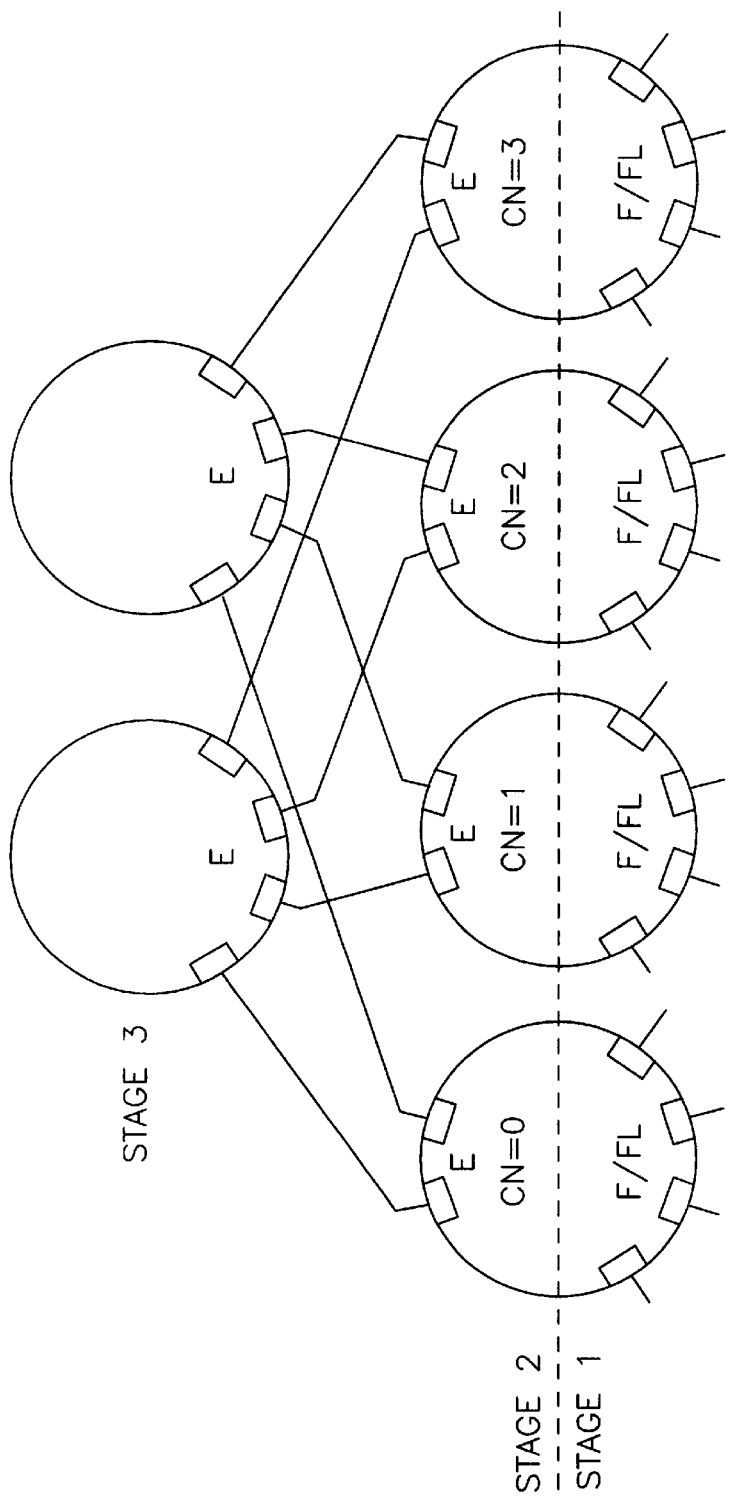

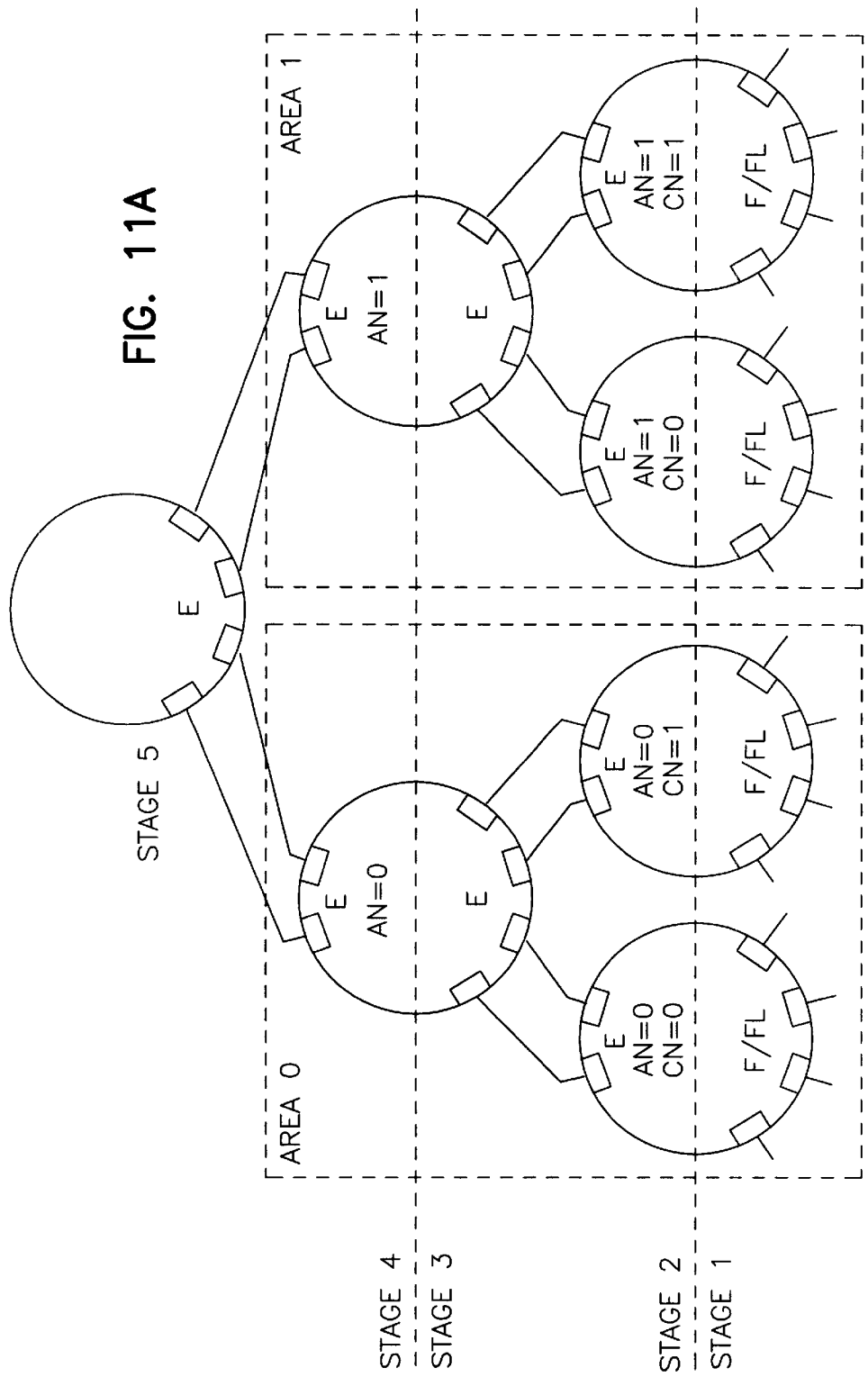

HIGH PERFORMANCE SWITCHING

RELATED APPLICATION

This application claims the benefit of U.S. Provisional Application No. 60/098,742, filed Sep. 1, 1998, entitled High Performance Switching, which is incorporated by reference.

FIELD OF THE INVENTION

This invention pertains generally to the field of high performance switching, including switches, networks and interconnect and addressing techniques suitable for implementing very high performance switching functions such as those defined in the Fibre Channel standards.

BACKGROUND OF THE PRIOR ART

There is an ever increasing need in the fields of computing and data handling for switches and devices for use in data handling environments which are capable of the highest performance in terms of bandwidth and switching flexibility. Examples include interconnecting computers and high-performance storage devices, interconnecting computers in a multiple-computer operating environment, and anywhere else where multiple high-speed data interconnections must be established between designated nodes or groups of nodes in a data handling network. The demands for size of interconnected networks, in terms of the numbers of nodes to be connected, and the amount of data bandwidth continue to increase, and these demands are only expected to accelerate in the future. These demands place great burdens on the requirements for switches or switching networks, and many switch topologies from the past cannot keep up with these demands.

To meet these growing needs, the Fibre Channel standard was developed and enacted as ANSI X3.T11. Various types of high performance switches or switch network devices have been developed and are available in the marketplace to at least partially implement certain Fibre Channel functions. The Fibre Channel standard itself is very forward-looking, in that it defines classes and standards of performance, but does not dictate the implementation technologies to be used in providing these functions. This is left in the standard as the fabric of the switch, and each potential implementer of a Fibre Channel switch is to design and develop its own switch fabric. At the time of enactment of the Fibre Channel standard many of the functions envisioned in the standard were not realizable, or were only realizable as specific subsets of the full Fibre Channel standard. Because of this, much of the promise of Fibre Channel remains unfulfilled.

SUMMARY OF THE INVENTION

To overcome these and other problems in the prior art, the present invention provides high performance switching networks and methodology for providing a practical implementation of Fibre Channel protocols.

According to one aspect of the invention, a two-dimensional Fibre Channel switched fabric is provided which combines a Fibre Channel Class 1 connection space-division multiplexing sub-fabric, and Class 2 and 3 connectionless space- and time-division multiplexing sub-fabric.

According to another aspect of the invention, there is provided an expandable multiport Fibre Channel standalone switch (for example, with 16 or 64 ports) which allows each fabric port to be used as a Fibre Channel F_Port, FL_Port or E_Port, depending on what device or devices are attached to it, with all Ports having access to both sub-fabrics.

According to another aspect of the invention, a switch module and methodology is provided for multiplying the number of user ports by combining modules into stages, so that, for example, a single stage can accommodate 64 user ports; a two-stage switch can accommodate 1026 user ports, and so on up to a five stage combination with 196,608 user ports.

Another aspect of the invention provides a Fibre Channel frame destination addressing methodology to support one, two, three and five stage topologies, as well as Fibre Channel arbitrated loop and alias functions.

Another aspect of the invention provides an addressing method for hardware routing of connectionless frames through the connectionless sub-fabric with minimum latency and maximum bandwidth.

Another aspect of the invention provides an addressing method for hardware routing Class 1 connect-request frames through the connectionless sub-fabric and setting up dedicated duplex connections at it goes, for minimum latency.

Still another aspect of the invention includes a method for hardware routing of Class 1 data frames through the connection sub-fabric for minimum latency and maximum bandwidth, with a hardware-managed Class 1 Disconnect function.

These and other features and advantages are provided with the present invention, as illustrated in the detailed descriptions of the preferred embodiments which follow.

BRIEF DESCRIPTION OF THE DRAWING

FIGS. 10A and 10B show a three-stage chassis and the addressing for it;

FIGS. 11A and 11B show a five-stage chassis and the addressing for it;

DETAILED DESCRIPTION OF THE PREFERRED EMBODIMENTS

The preferred embodiments of improved switching apparatus and methods of the invention are described herein with reference to certain terms defined in the Fibre Channel standard. For convenience, a Glossary is attached which includes selected Fibre Channel terms. The Glossary also includes a section on Device Terms, which are used in this description of the preferred embodiments of the invention.

Figure 1:
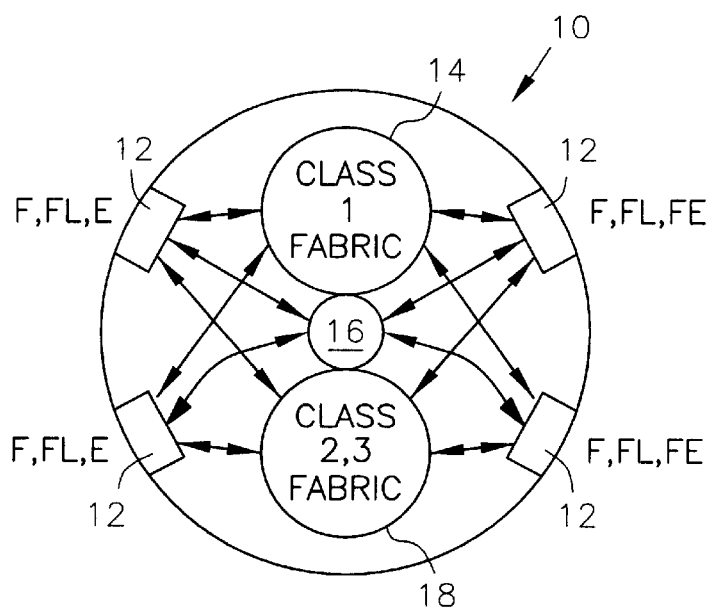
FIG. 1 is a conceptual diagram of a single stage Fibre Channel switch according to the invention.

FIG. 1 illustrates in conceptual form the general architecture contained within a Fibre Channel switch module, or chassis as that term is used herein. In FIG. 1, chassis 10 is shown as having a number of fabric ports 12. For simplicity and clarity of illustration, only four fabric ports 12 are shown, but it will be appreciated that any number x of ports may typically be provided, where x is 16–64. In the case of the switch chassis of the present invention, each port is capable of being functioning as an F_Port, an FL_Port or an E_Port, depending on what device is attached to it.

The fabric ports 12 are connected through the fabrics of the switch such that in general, individual ports may be selectively interconnected to other ports. Specifically, switch 10 is illustrated conceptually in FIG. 1 as having a connection subfabric 14 for handling Class 1 traffic, a connectionless subfabric 18 for handling Class 2 and 3 traffic, and an internal fabric controller 16. The fabric ports 12 interconnect with each of fabrics 14, 18 and controller 16, as indicated by the interconnect arrows in FIG. 1. Typically, connection frames (SOFi1 and SOFn1) use the connection subfabric 14 to get from one fabric port to another, and connectionless frames (SOFc1, SOFi2, SOFn2, SOFi3 and SOFn3) use the connectionless sub-fabric to get from one fabric port to another. Fabric control frames use the fabric controller paths. Fabric controller 16 handles a number of functions including name server, alias server, fabric login/logout, handling exceptions such as addresses non-existent ports, and higher level functions such as broadcast and multicast.

Fabric port receivers (not shown) are provided to de-intermix the frames, so that connection frames are routed to the connection fabric 14, and connectionless frames are routed to the connectionless fabric 18. At the fabric port transmitters, connection and connectionless frames are intermixed. Connectionless frames from the connectionless fabric are interspersed with connection frames from the connection fabric. This is the Fibre Channel Intermix function.

In any topology any N_Port or public NL_Port can exchange frames with any other N_Port or public NL_Port in the system.

Single and Multi-stage Topologies

Figure 2:
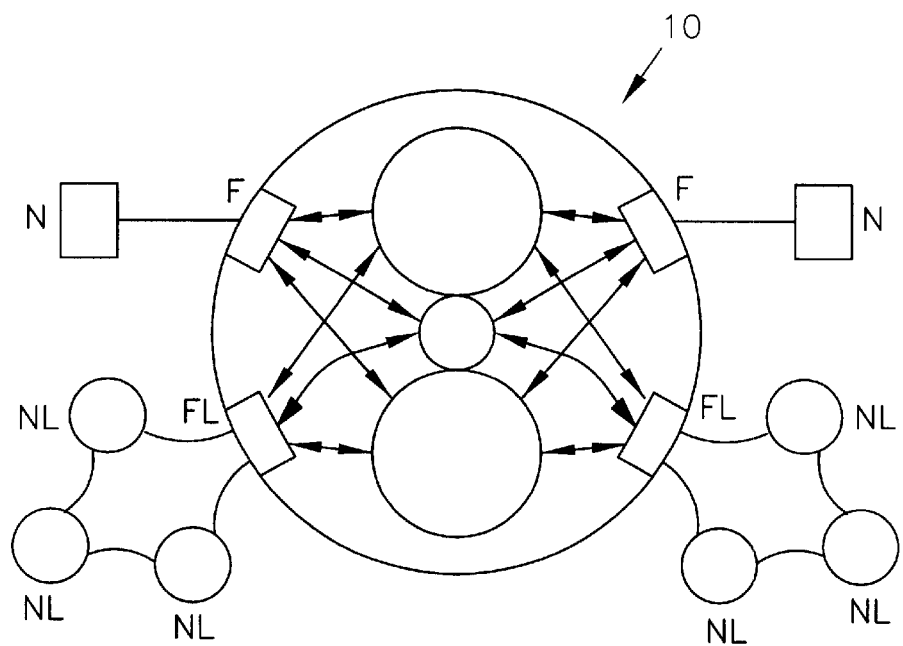
FIG. 2 is a conceptual diagram similar to FIG. 1, showing attachment to external devices to make a one-stage chassis.

FIG. 2 shows a single stage topology. In this use, all fabric ports are used as either F_Ports or FL_Ports. There can be multiple F_Ports, each connected to a single N_Port. There can be multiple FL_Ports, each connected to a single public arbitrated loop, with a maximum of 126 participating NL_Ports connected to an FL_Port, which can be any mixture of public and private devices. Public devices can communicate with any device on the loop and with any device off the loop. Private devices can communicate only with devices on the loop.

For purposes of describing the steering algorithm, FIG. 2 labels the Stage 1 fabric ports.

Figure 3:
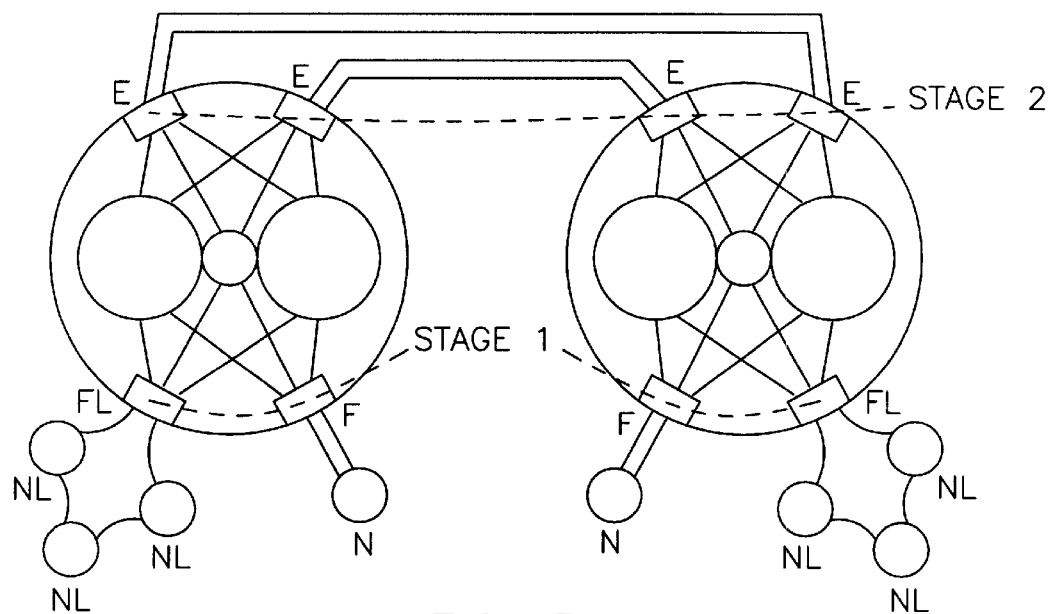
FIG. 3 is a conceptual diagram of a two-stage Fibre Channel switch according to the invention.

FIG. 3 shows a 2-stage topology, utilizing two chassis 10. A certain number of fabric ports are used as E_Ports, and are used to interconnect two or more chassis 10 together to provide additional user ports beyond the number which a single-stage system can provide. The number of E_Ports and interconnect links employed is a variable, based on the amount of inter-chassis bandwidth required by the application. Once the chassis are interconnected in the topology of FIG. 3, the system functions as one monolithic system, and a user sees only a single system with more fabric ports.

When chassis are interconnected according to the invention, there are always one or more active links between any stage 1 chassis and any other stage 1 chassis. This means that there is never more than one additional link hop when a frame originates in one chassis and travels to a destination in a different chassis.

For purposes of describing the steering algorithm, FIG. 3 labels Stage 1 and Stage 2 links. The Stage 1 link is identical to the link of the same name as in a one-stage system.

Figure 4:
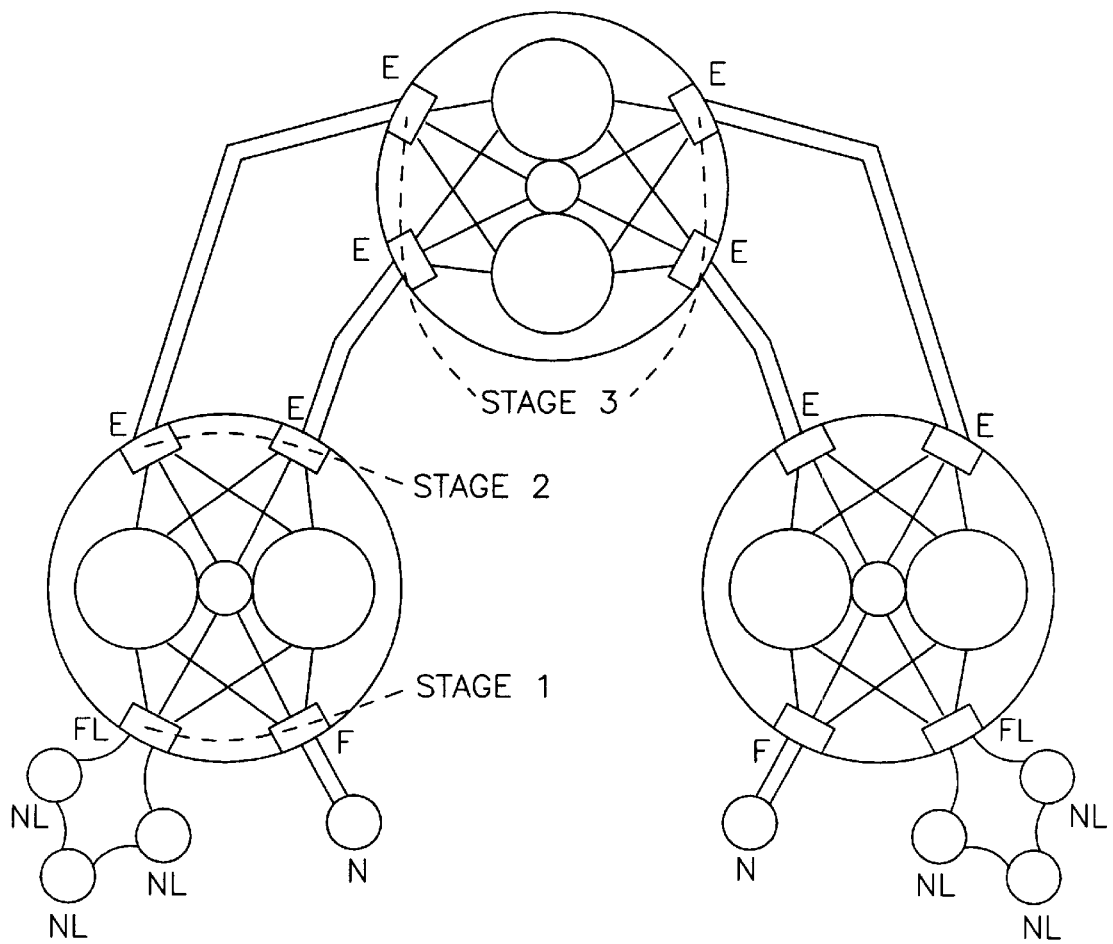
FIG. 4 is a conceptual diagram of a three-stage Fibre Channel switch according to the invention.

FIG. 4 shows a three-stage topology, utilizing three chassis 10. Up to 64 user chassis can be cross-connected together to provide additional ports beyond the number which a two-stage system can provide. The cross-connect function is provided by one or more chassis 10 whose ports are only used as E_Ports. In FIG. 4, for simplicity of illustration, only two Stage 1/2 chassis are shown connected to the E_Port interconnect chassis, but it will be appreciated that more can be provided, by using more of the fabric ports on that chassis (not shown). The number of cross connect links and E_Ports used is a variable based on the amount of inter-chassis bandwidth required for a given application. When connected in a three-stage system, the system functions as one monolithic system, and a user sees only a system with more fabric ports. There must be one or more active links between each Stage 2 chassis and each Stage 3 chassis. This means that there are never more than two additional link hops when a frame originates in one user chassis and travels to a destination in a different user chassis.

For purposes of describing the steering algorithm, FIG. 4 labels Stage 1, Stage 2 and Stage 3 links. The Stage 1 link is identical to the link of the same name as in a one-stage system.

Figures 5, 6:
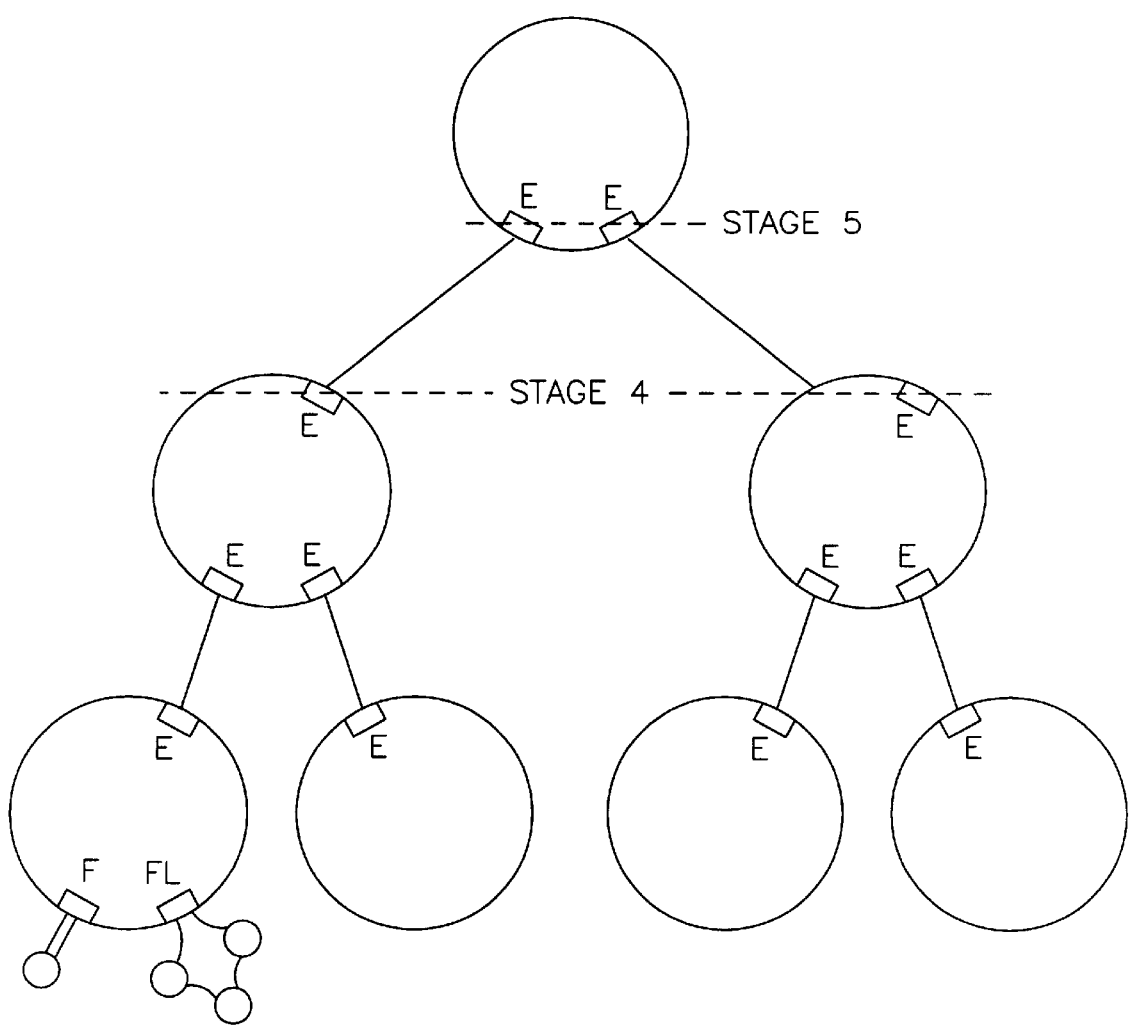
FIG. 5 is a conceptual diagram of a five-stage Fibre Channel switch according to the invention.
FIG. 6 is a diagram showing the use of the Fibre Channel Source and Destination address field for addressing according to the invention.

FIG. 5 shows a five-stage topology, in which up to 4096 user chassis can be cross-connected together to provide additional ports, beyond the number that a three-stage system can provide. The five-stage embodiment adds an additional layer of cross-connections, to connect the equivalent of multiple three-stage systems. The number of cross-connect links employed, and thus the number of E_Ports is a variable, based on the amount of inter-chassis bandwidth required by the application. Once connected as a five-stage system, the system functions as a monolithic system, and a user sees only a system with more fabric ports.

For purposes of describing the steering algorithm, FIG. 5 labels Stage 1, Stage 2, Stage 3, Stage 4 and Stage 5 links. The Stage 1, Stage 2 and Stage 3 links are identical to the links of the same name in a three-stage system.

Within a stage 3, there must be one or more active links between each stage 2 chassis and each stage 3 chassis. There must also be one or more active links between each stage 4 chassis and each stage 5 chassis. This means that there are never more than four additional link hops when a frame originates in one user chassis for a destination in a different user chassis.

Addressing Methodology

FIG. 6 describes how the Fibre Channel FC-PH specification Destination ID field (D_ID) and Source ID field (S_ID) is utilized for this architecture. D_ID is a 24-bit field, bits 23–0 in the 2nd word of the Fibre Channel frame, used to describe the destination address of a frame transiting the switch. S_ID is a 24-bit field, bits 23–0 in the 2nd word of the Fibre Channel frame, used to describe the source address of a frame transiting the switch.

Each fabric port is assigned an ID that utilizes the format shown in bits 23:8, and in general, every device attached to it utilizes the same ID in bits 23:8. In addition, if a loop is active, bits 7:0 are also utilized. An N_Port would assume the bits 23:8 as its ID. An NL_Port would assume bits 23:0 as its ID. When an N_Port transmits a frame into the fabric, it puts the destination address in D_ID, and its own address in S_ID. The receiving fabric port will route the frame according to D_ID(23:8). The destination fabric port will attempt to access an N_Port if D_ID(7:0)=00hex, and will attempt to access an NL_Port if D_ID(7:0) 00hex.

Figure 7A:
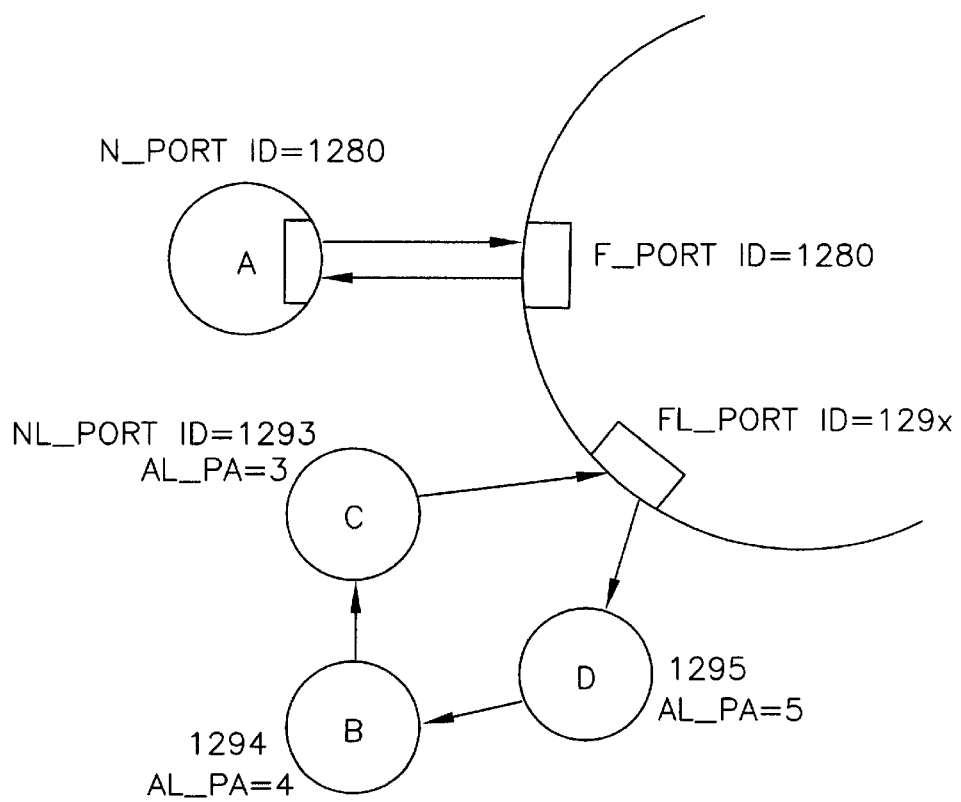
FIGS. 7A and 7B are diagrams showing port and virtual ID naming conventions used in the addressing method.

FIG. 7A illustrates this port ID naming convention. In FIG. 7A, a portion of a chassis 10 is shown, having an F_Port connected to an N_Port of a device A, and an FL_Port connected to a loop with devices B, C and D. The port ID's are indicated on FIG. 7A. Following this scheme, a frame going from A to B would have a D_ID of 1294, and a S_ID of 1280. A frame going from B to A would have a D_ID of 1280, and S_ID of 1294.

The architecture of the present invention parses the D_ID in a manner that allows routing the frame through all of the topologies of FIGS. 2–5, previously described. The individual D_ID bit fields are as follows:

AL_PA describes one of 256 possible arbitrated loop node IDs and corresponds to the FC-AL Arbitrated Loop Physical Address (AL_PA). If an arbitrated loop is attached to a particular PN, this field is used to address individual NL_Ports on the loop. If an arbitrated loop is not attached, this field is ignored.

PN (Port Number) identifies one of 64 possible fabric ports within a chassis. It is this fabric port that can be either an F_Port, FL_Port or E_Port. This field is required for one, two, three and five-stage systems.

CN (Chassis Number) identifies one of 64 possible chassis or chassis, each of which can have up to 64 fabric ports, each of which can be either an F_Port, FL_Port or E_Port. This field is required for two, three and five-stage systems.

AN (Area Number) identifies one of 64 possible areas, each of which can have up to 64 chassis or chassis, each of which can have up to 64 fabric ports, each of which can be either an F_Port or an E_Port, but not an FL_Port. This field is required for five-stage systems.

FID (Fabric ID) determines whether the frame is a candidate for hardware routing. When a frame arrives at a fabric port, the frame FID is compared against the native FID programmed by microcode. If the frame FID matches the native FID, the frame will be hardware-routed in most cases. If the ID does not match this single value, the frame will be software-routed instead.

Figure 8A:
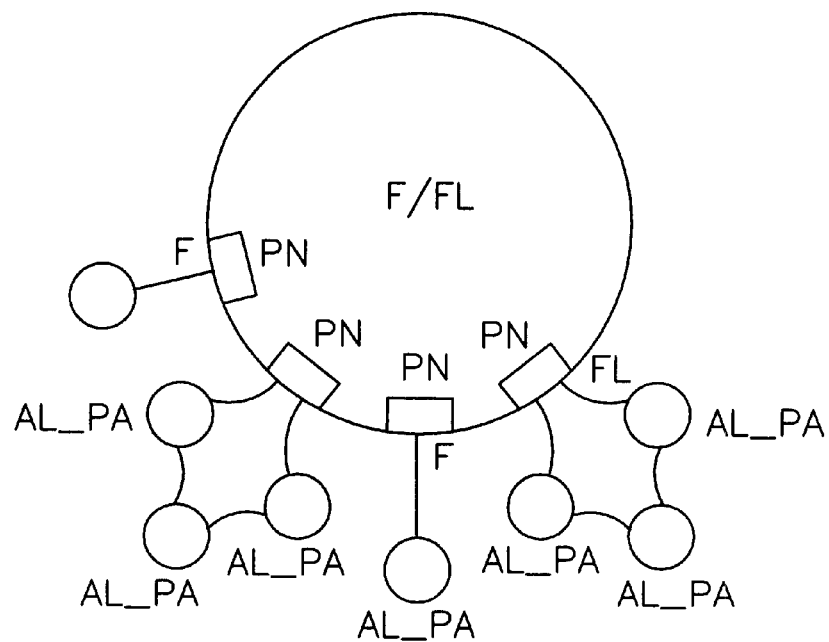
FIGS. 8A and 8B show a one-stage chassis and the addressing for it.
Figure 8B:
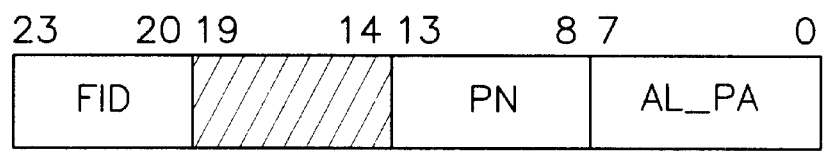

FIGS. 8A and 8B describes addressing in a one-stage system. Only the PN field is used, allowing a maximum of 64 fabric ports, which may be either F_Ports or FL_Ports. If an F_Port, the field AL_PA is not used. If an FL_Port, the AL_PA field denotes 1 of 126 possible NL_Ports. FID is used to denote hardware-routed vs software-routed frames. A 16-port chassis supports PN values of 0–15, while a 64-port chassis supports PN values of 0–63.

Figures 9A, 9B:
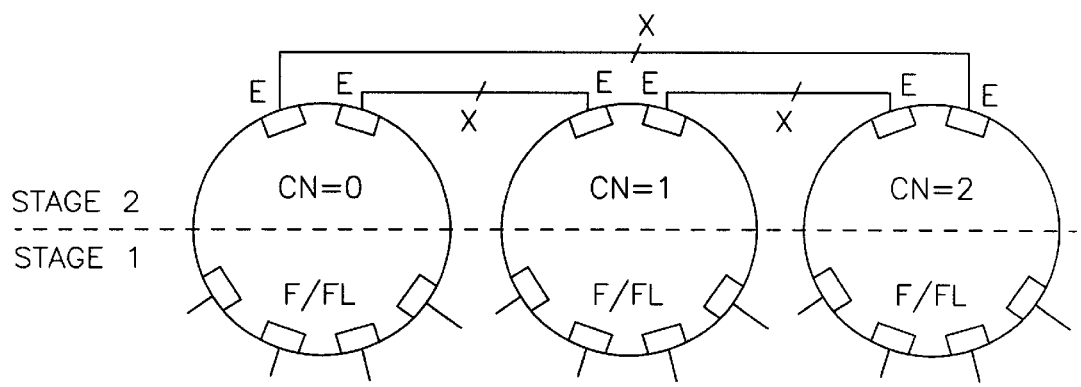
FIGS. 9A and 9B show a two-stage chassis and the addressing for it.

FIGS. 9A and 9B describe addressing in a two-stage system. CN and PN are used, allowing a maximum of 4096 fabric ports. The CN field allows multiple chassis, and CN is used to differentiate between chassis. PN and AL_PA function the same as for one-stage. Some of these ports will be used for F_Ports and FL_Ports, while others will be used for E_Ports for interconnection links between chassis.

This implementation uses direct interconnect, rather than cascading. Direct interconnect means that there will be one or more active E_Ports between every chassis pair, so that there is always a single direct connection between any chassis pair. This limits the total available fabric ports to considerably less than the 4096 implied in the addressing scheme, but allows expansion to more fabric ports than one stage allows, while maintaining the single E_Port hop.

In the example shown in FIG. 9A, there are three chassis whose CN values are 0, 1 and 2. If a frame is received on a fabric port in chassis 0, and the destination is chassis 0, hardware will route the frame within the chassis to the destination fabric port using the PN field. If the frame destination is in chassis 2, hardware will route the frame to any E_Port connected to chassis 2, where the frame will be routed to the destination fabric port using the PN field. Where there are multiple E_Ports to pick from, hardware will pick the one that is the least active.

FIGS. 10A and 10B describe addressing in a three-stage system. CN and PN are used, allowing a maximum of 4096 fabric ports. The CN field allows multiple chassis, and CN is used to differentiate between chassis. PN and AL_PA function the same as for one-stage. Some of the fabric ports will be used for F_Ports and FL_Ports, while others will be used for E Ports for cross-connect links between chassis.

This implementation used cross-connect, rather than interconnect. Cross-connect means that there will be one or more active E_Ports between every stage 2 chassis and every stage 3 chassis, and any frame requiring a path to a different stage 2 chassis can use any link to any stage 3 chassis. This means that any path from any stage 1/2 chassis and any other stage 1/2 chassis will always have exactly 2 internal fabric hops.

In the example shown in FIG. 10A, there are four stage 1/2 chassis whose CN values are 0, 1, 2 and 3. If a frame is received on a fabric port in chassis 0, and the destination is chassis 0, hardware will route the frame within the stage 1 chassis to the destination fabric port using the PN field. If the frame destination is in chassis 2, hardware will route the frame to any E_Port where the frame will be routed in the chosen stage 3 to the destination fabric port using the CN field. Where there are multiple E_Ports to pick from, hardware will pick the one that is the least active.

FIGS. 11A and 11B describe addressing in a five-stage system. AN, CN and PN are used, allowing a maximum of 262,144 fabric ports. The AN field allows multiple 4096 fabric port areas, and is used to differentiate between these areas. The CN field allows multiple chassis within an area, and CN is used to differentiate between chassis. PN and AL_PA function the same as for one-stage. Some of the fabric ports will be used for F_Ports and FL_Ports, while others will be used for E_Ports for cross-connect links between chassis. The 5-stage embodiment is discussed further below in connection with addressing.

Switching Networks

As previously discussed, the present invention provides switching networks having different numbers of stages and ports. As an example, the switching network of FIG. 12 will be described, including its component parts shown in detail in FIGS. 14–18. As a further example, the switching network of FIG. 13 will be described. The FIG. 13 network is built up from four of the networks of FIG. 12, which are also referred to as quadrants.

The network of FIG. 12 includes four ASICs 50, which are described in greater detail below. Each ASIC 50 has 4 link ports 52. In addition, each ASIC has four ports (not numbered) going out to the connectionless backplanes 60. Actually, as described in detail below, there are four connectionless backplanes, and for simplicity they are grouped as element 60. Reference number 70 is the external connectionless serial crossbar, which serves as the connectionless fabric. As shown, each ASIC 50 has four bidirectional ports going to and from external connectionless serial crossbar 70. In addition, each ASIC 50 has a its switch port connected via connection 72 for programming the connectionless serial crossbar 70. This is used for long-lived connections. There is no counterpart for that for the connectionless backplanes 60, because those logical connections are done on a frame by frame basis.

Microprocessor 80 connects to each of the ASICs 50 by shared bus 82. It will be understood that microprocessor 80 includes the usual supporting subsystems such as static RAM, flash RAM, PROM memory, a UART and connector, and an Ethernet controller and connectors, but for simplicity these have not been shown in the figure. The microprocessor 80 is the heart of the internal fabric controller 16 of FIG. 1, and its function will be described below.

ASIC Switch Module

Figure 12:
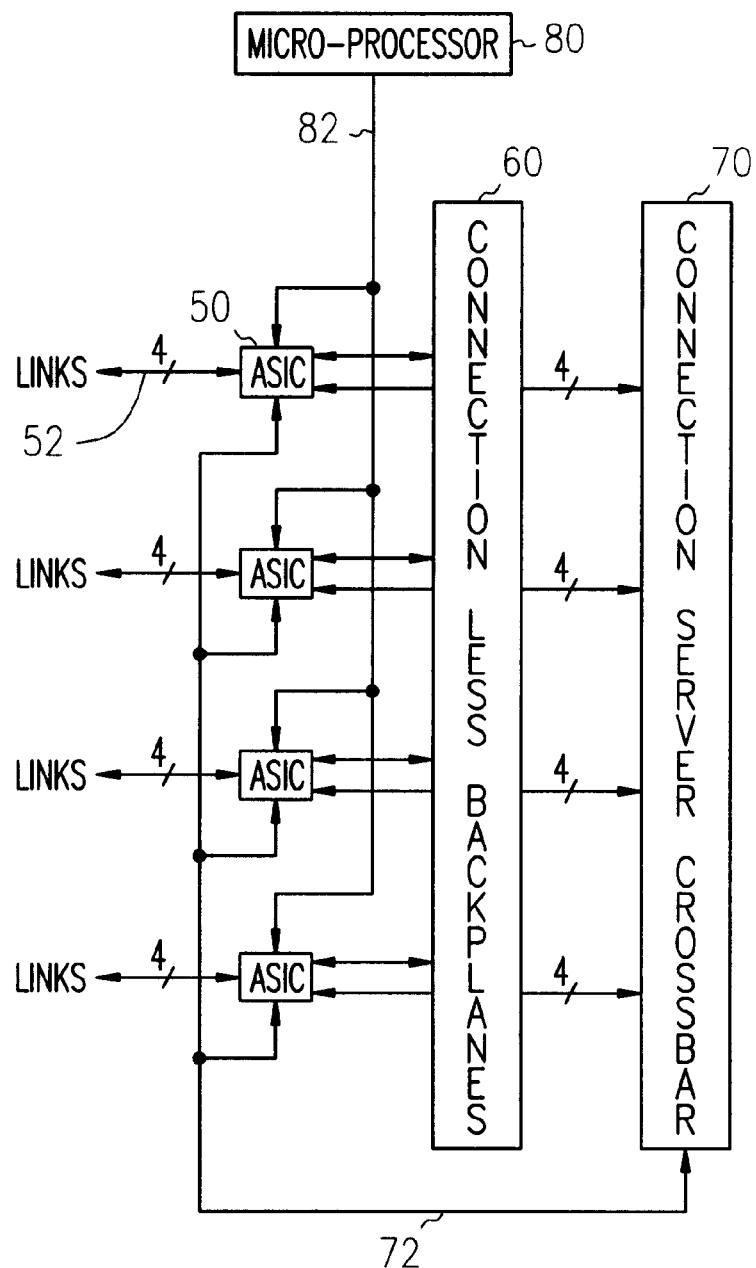
FIG. 12 is a block diagram of a 16-port switching network according to a preferred embodiment of the invention.
Figure 14:
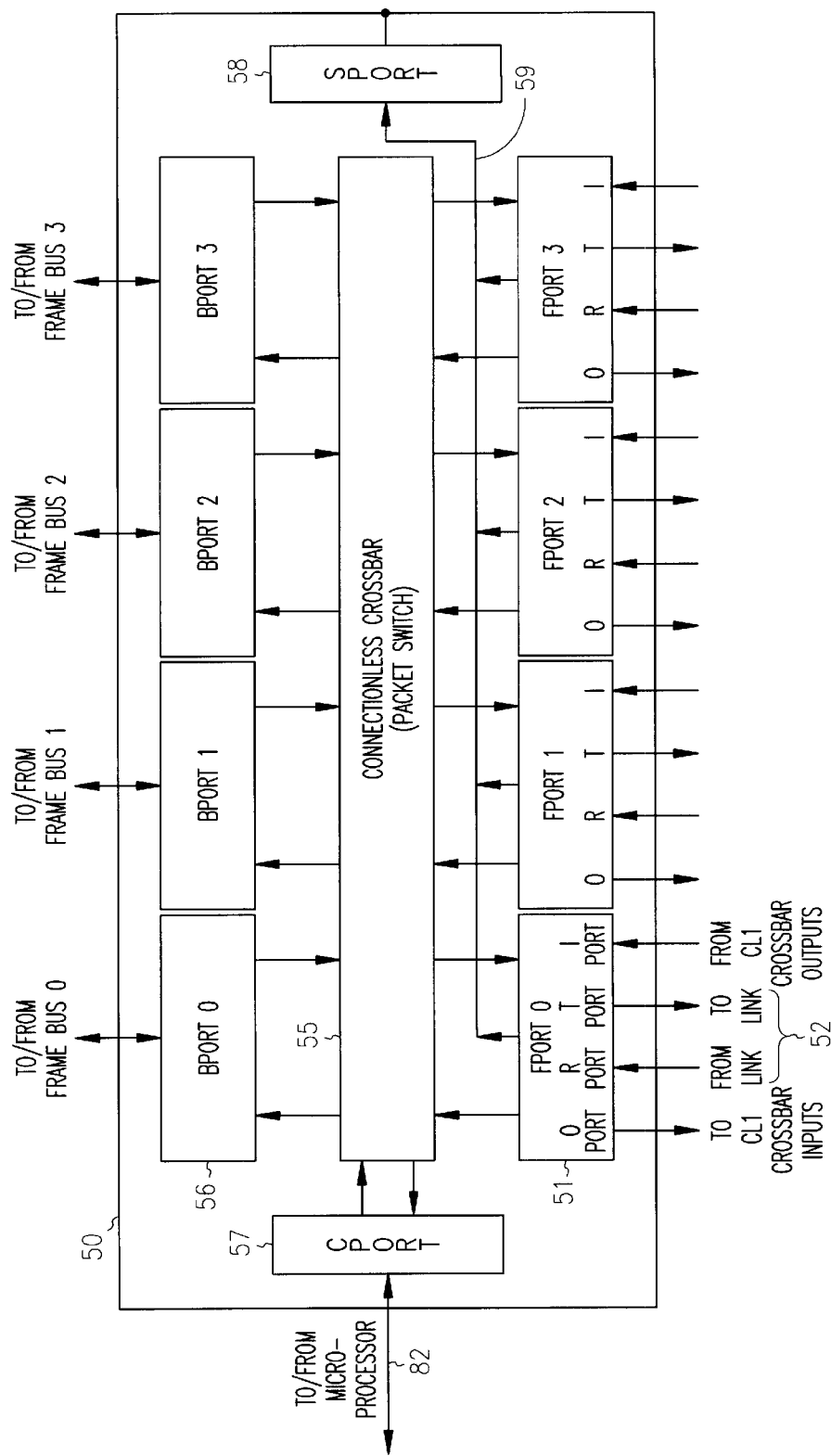
FIG. 14 is a block diagram of the ASIC component of the switching network of FIG. 12.

An ASIC 50 from FIG. 12 is shown in greater detail in FIG. 14. It includes four FPORT circuits 51 (FPORT0 through FPORT3), four BPORT circuits 56 (BPORT0–BPORT3); a CPORT 57; and SPORT 58; and a connectionless crossbar, or packet switch, 55. These components are described in greater detail below with reference to FIGS. 15–18.

Each of the FPORTs has four F__Ports, which are labelled the O-port, R-port, T-port and I-port. The R-port and the T-port (receive, transmit) connect as the input and output ports of the actual Fibre Channel link. The O-port and the I-port go as inputs and outputs to the class 1 crossbar 70 which is on the circuit board in FIG. 12.

The BPORTs connect to crossbar 55 and also connect to/from frame buses 0–3 which connect to the connectionless backplane 60 of FIG. 12.

CPORT (control port) 57 connects to/from the microprocessor bus 82. SPORT (switch port) 58 is connected via bus 59 to each of the FPORT circuits 51. SPORT 58 also connects externally of the ASIC 50 to control bus 72 to the crossbar 70 of FIG. 12.

Crossbar, or packet switch 55 selectively connects to the FPORTs, the BPORTS, the CPORT and the SPORT and is used for transmitting connectionless class 2 and 3 frames within ASIC 50. Note that crossbar 55 is separate from the crossbar 70 of FIG. 12. Crossbar 55 is within ASIC 50; crossbar 70 is at the board level interconnecting a number of ASICs 50.

Figure 15:
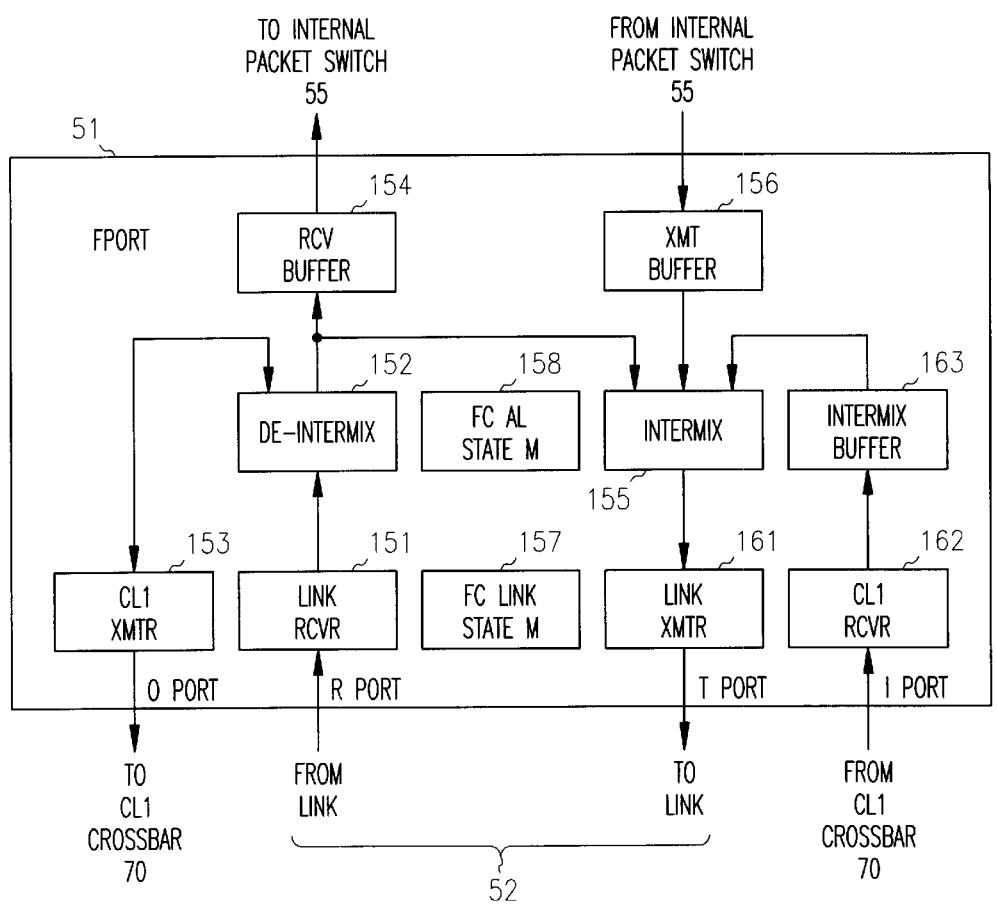
FIG. 15 is a block diagram of the FPORT component of the ASIC of FIG. 14.

An FPORT 51 circuit is shown in greater detail in FIG. 15. The connections to/from circuit 51 which are shown in FIG. 14 are labelled accordingly in FIG. 15. Frames received from the Fibre Channel link are received by Link Receiver 152, which connects to De-Intermix block 152. One output of De-Intermix block 152 connects to Class 1 Transmitter 153, which connects out the O Port to the Class 1 connection crossbar 70 of FIG. 12. Another output of De-Intermix block 152 connects to Receive Buffer 154 and Intermix block 155. Transmit buffer 156 and Intermix buffer 163 also connect to Intermix block 155. The output of Intermix block 155 connects to Link Transmitter 161, which connects to the Fibre Channel link through the T Port. The I Port connects from the Class 1 connection crossbar 70 of FIG. 12 to Class 1 Receiver 162, whose output connects to Intermix buffer 163.

Fibre Channel frames coming from the Fibre Channel link into the R Port of FPORT circuit 51 are received and processed at Link Receiver 151. This processing includes standard Fibre Channel functions such as decoding from 10b coding format to 8b coding format, checking CRC for errors, and parsing the frame. Next the frame goes into De-Intermix block 152 which separates connection (class 1) frames and connectionless (class 2 and 3) frames. Connection frames are directed out through the Class 1 transmitter 153 and the O-port out, where they are sent out of ASIC 50 to the connection crossbar 70. The connectionless frames continue inward into circuit 51, into receive buffer 154, where they are buffered in order to maintain flow control for packet switching through Connectionless crossbar 55 of FIG. 14. Once a frame gets into Receive buffer 154 and the Receive buffer is ready to move it on and can find a path down to a transmitter it wants, according to the destination address of the frame, it uses the packet switch 55 to move it to that point. This follows standard protocols for moving data in a packet switch.

Link transmit functions are provided by Link transmitter 161, which connects through the T Port to the Fibre Channel link. Link transmitter 161 performs standard Fibre Channel functions such as error checking and converting from 8b coding to 10b coding. Frames are fed to Link transmitter 161 from Intermix block 155. The intermix function is where connection frames from the external crossbar 70 and connectionless frames from the internal packet switch 55 are mixed in accordance with Fibre Channel protocols. In addition, the Intermix block is part of implementing the Fibre Channel arbitrated loop function. According to that function, a frame can come in on Link receiver 151 and be routed back out Link transmitter 161 for arbitrated loop operation. In connection with this function, FPORT circuit 51 also has the Fibre Channel arbitrated loop state machine, indicated by reference number 158. It also has the Fibre Channel link state machine 157. The functions of these state machines are defined in the Fibre Channel specifications.

The I Port and Class 1 receiver 162 receive frames from the class 1 crossbar 70 of FIG. 12. Receiver 162 does standard processing on received data, such as converting from 10b coding to 8b coding, then it puts frames into Intermix buffer 163. This buffer provides a place for an incoming connection frame to back up while Intermix block 155 may be transmitting a connectionless frame out.

Figure 16:
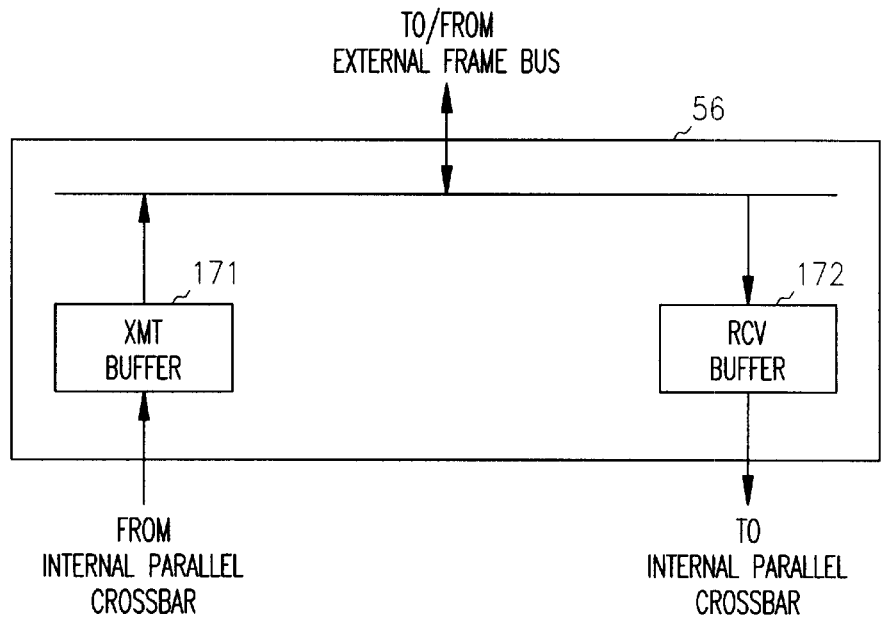
FIG. 16 is a block diagram of the BPORT component of the ASIC of FIG. 14.

FIG. 16 shows the B Port circuit 56 in greater detail. It includes Transmit buffer 171, Receive buffer 172, Control register 173 and Status register 174. These two elements are for communication of control commands and status to and from the microprocessor 80. The Transmit buffer 171 and Receive buffer 172 connect the internal connectionless crossbar (packet switch) 55, and to the external frame bus. The function of the B Port is to transmit frames onto a frame bus to receiving frames from a frame bus. These are the frames that are going from one ASIC 50 to another ASIC 50 (FIG. 12) while being routed to their correct destination. Frames which are to go out of a BPORT 56 on to a frame bus will come from the internal connectionless crossbar 55 and be stored in Transmit buffer 171. The frame buses are bidirectional, and Receive buffer 172 is provided. The frame bus is packet switched, and the BPORT can either act as a master when transmitting or slave when receiving. The Transmit buffer 171 handles requesting a frame bus, receiving a grant, and then transmitting a frame to its destination chip on the frame bus.

Figure 17:
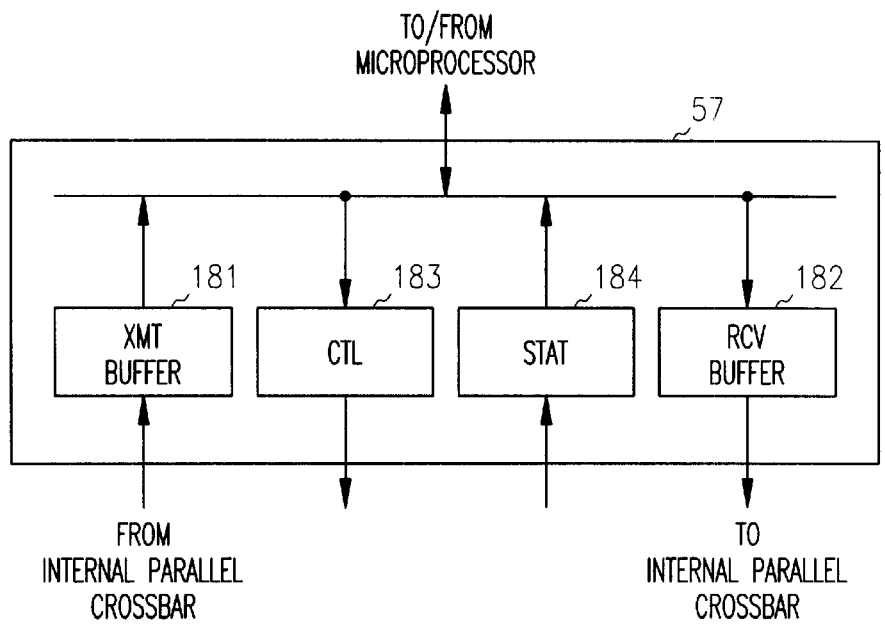
FIG. 17 is a block diagram of the CPORT component of the ASIC of FIG. 14.

FIG. 17 shows C Port 57, which serves as the interface to microprocessor 80. It includes Transmit buffer 181, Receive buffer 182, Control register 183 and Status register 184. The Transmit buffer 181 and Receive buffer 182 connect to the internal connectionless crossbar (packet switch) 55, and to bus 82 to the microprocessor 80. C Port 57 has both a transmit buffer and a receive buffer because the microprocessor can both sink or source frames. C Port 57 also has registers called control and status where the microprocessor can either change the characteristics of the chip by writing different things in the control registers, or it can monitor conditions in the chip or be interrupted by the chip by various codes that are put into the status register.

Figure 18:
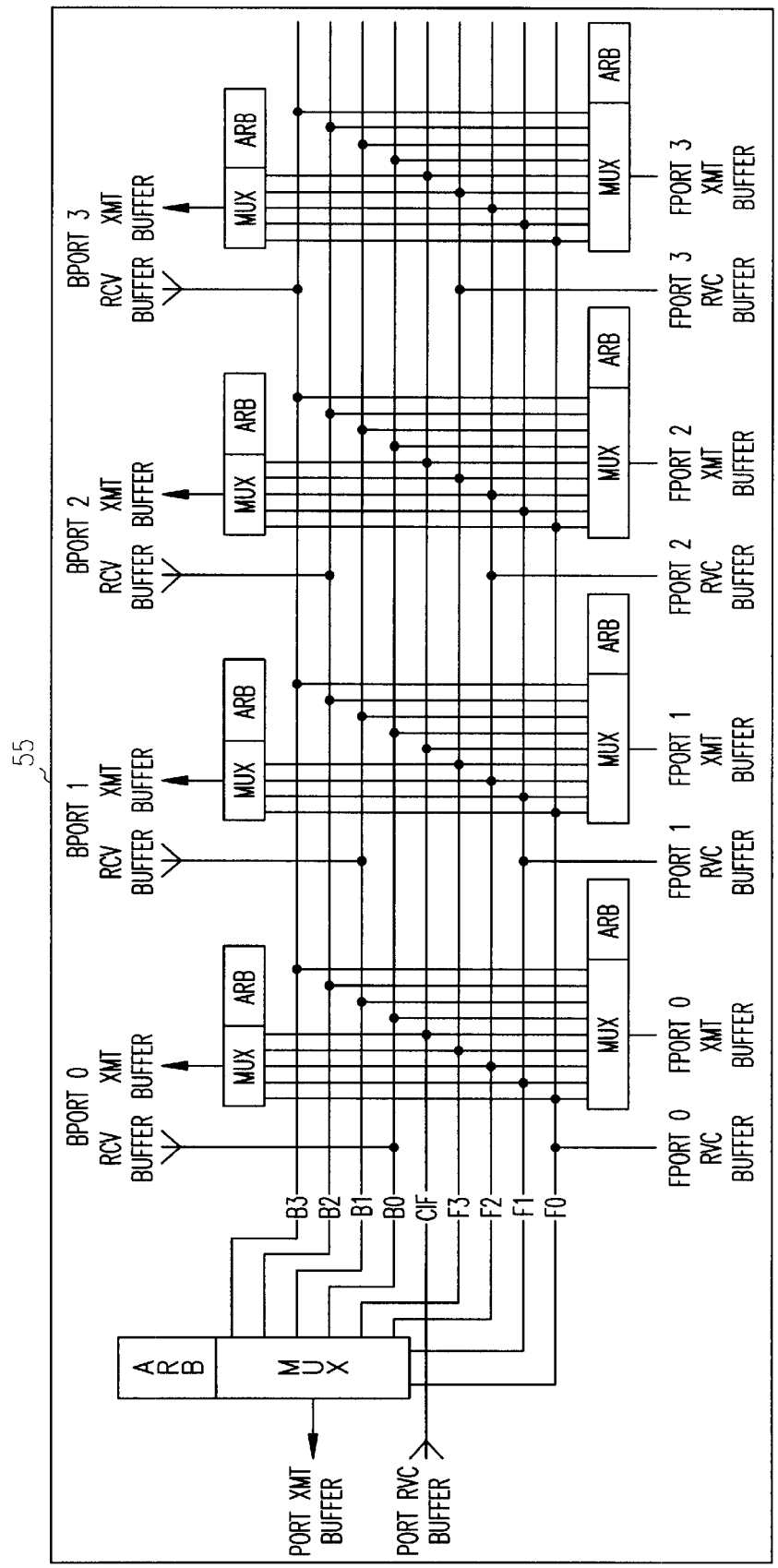
FIG. 18 is a block diagram of the connectionless crossbar component of the ASIC of FIG. 14.

FIG. 18 shows the internal connectionless crossbar 55 of the ASIC 50. This function can be realized through the use of a commercially available 9×9 packet switch chip. FIG. 18 shows the interconnections of the transmit and receive sides of FPORTs -0 through -3, and BPORTs -0 through -3 for data routing, as well as the MUX and arbitration functions of the packet switch.

As shown in FIG. 14, each FPORT connects through bus 59 to SPORT 58 (however this is not shown in FIG. 15). Each of the FPORTs 51 on the ASIC 50 are capable of vying for and getting the control of SPORT 58, for purposes of routing connection frames. The SPORT is connected to the external bus switch bus 72 (FIG. 12) and it vies, together with the other four ASICS on that bus, for control and programming the external class 1 crossbar 70 to set it up for duplex transmission of a frame to its destination.

The microprocessor 80 of FIG. 12 has a number of functions. One of these is initialization. Upon initialization, the microprocessor clears the system and switch ASICS, then does a topology discovery. This is done because there are a number of ways in which different quadrants can be connected, and each quadrant and therefore the ASICS on it need to be mapped in terms of all the others, as this will affect how frames are routed through the switching network. The microprocessor, by talking to other microprocessors and other connected chassis can figure out the topology. Once it does that, it goes to each ASIC and programs them to tell them how to steer frames based on where they are in the topology.

The microprocessor also implements some higher-level functions. Most normal frame movement is done entirely by the ASIC hardware without involving the microprocessor. The hardware routes ordinary class 2 and class 3 connectionless frame without any intervention by, or even knowledge of, the microprocessor. Similarly, after setting up class 1 connections, class 1 frames flow through without any action or knowledge by the microprocessor. However, the microprocessor handles higher level Fibre Channel function like broadcast or multicast, broadcast. In broadcast, a frame comes into one port and a copy is going to be sent to every other port in the system Multicast is a subset of broadcast, for selected ports. The hardware is capable of detecting frames for broadcast or multicast, and route them to the microprocessor, which then broadcasts these frames to their destination ports. This is slower than the hardware switching of normal frames, but permits optimization for the normal routing case.

Also, in Fibre Channel, there are certain frames intended for talking to the fabric, rather than being routed through the fabric to another port, and the microprocessor handles these also.

Figure 13:
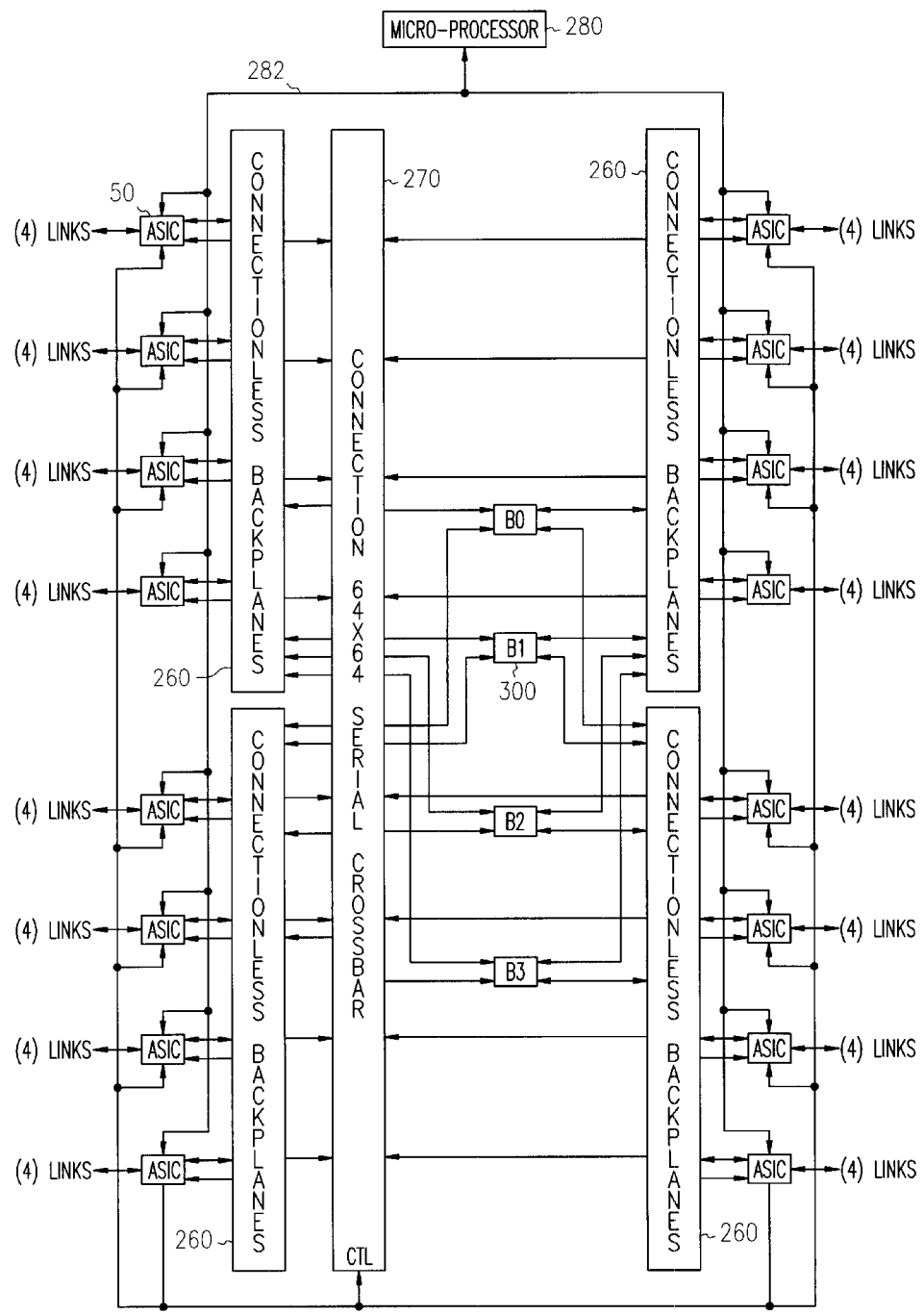
FIG. 13 is a block diagram of a four quadrant, 64-channel chassis utilizing combinations of the switching network of FIG. 12.

FIG. 13 shows a 64-channel box or chassis, made up basically of four of the 16-channel quadrants of FIG. 12. As shown, each quadrant consists of four ASICs, their Fibre Channel links, and their connectionless backplane 260, all similar to that which is described above. All connect via bus 282 to microprocessor 280. In addition, all of the ASICs of all four quadrants connect to a large 64×64 connection serial crossbar 270. All 16 ASICS can vie for crossbar 270. For maximum system performance, crossbar 270 should have as high a bandwidth as possible. One embodiment uses a crossbar rated at 64 concurrent full-speed, 100 megabytes per second total aggregate system bandwidth connections. This crossbar 270 provides full connectivity for connection, or class 1 traffic.

In order to get full conductivity for connectionless frames, because there are four separate sets of connectionless frame busses, one for each quadrant, four additional crossbars 300 are provided, labelled B0 through B3. These connect all frame bus 0's together so frame bus 0 from quadrant 0, frame bus 0 from quadrant 1, quadrant 2 and quadrant 3 all go up to one crossbar B0. This ties together all frame bus 0's. And anything that has to go between quadrants then can go through B0. Because there are four frame bus 0's, four frame bus 1's, four frame bus 2's and four frame bus 3's in the system, there is a crossbar for each, B0, B1, B2 and B3. These crossbars are parallel, and preferably designed for high aggregate bandwidth such as 200 MB/s.

The B0–B3 crossbars are contended for by the ASICs. When an ASIC is trying to move a frame it puts a destination address that's steering-determined out onto the frame bus. If it turns out that another ASIC within the same quadrant has that address, it will answer, following which the frame can be routed. But if it happens to be an address that's in a different quadrant, then one of the B crossbars 300 will answer because they each have been programmed by the microprocessor at startup to knows what sets of addresses they service. The frame can then be routed to the correct quadrant, and from there to the correct port. Microprocessor 280 also handles exceptions when there are address errors.

Addressing

For connection frames, once a connection is set up, there is no need to check D_IDs; instead the class 1 frames are routed out another port to follow a dedicated connection set up by a prior SOFc1. Initially, a SOFc1, the class 1 connect request, will route through the connectionless fabric just like a connectionless frame. Even though it represents class 1, the request frame is a connectionless frame because it has to route through the frame before any connections are made. After setup, a class 1 ACK (acknowledgment) frame comes goes back via the just set up connection path, and then both ends are free to transmit/receive in class 1 mode.

For connectionless frames (including SOFc1), address decoding determines routing. Different topologies, such as FIGS. 2 through 5 can have different numbers of ASICS 50 in them. Consider the case where there are four ASICs in a single-stage chassis, but with the understanding that it could be any number, for example could be four or sixteen in a one-stage single chassis. The single-stage case is represented by the address of FIG. 8B and then the topology of FIG. 8A. All the ASICs are programmed similarly in that they're all programmed as stage ones, not as stage 2's, 3's or 4's. In this case, any time they see a frame coming into one of their ports, that first of all they will look at the FID part of the D_ID, see whether it matches the native fabric ID of this box. There is no need to look at bits 14–19 which are typically the chassis number. In the one-stage topology then, there can be hardware routing because the fabric ID matches, then a look at the D_ID port number bits 8 to 13 will tell where to route within the same chassis. If it's not a match, in the case of this one-stage chassis, it means there is an error, and it will route the frame to the microprocessor for handling, for example by sending back a Fibre Channel reject frame.

Additional addressing in bits 0–7 are used if the destination port is an FL_Port. In that case, once the frame gets down to the ASIC having the destination port, then that port has to decide whether it's implementing a loop, is it an FL_Port or is it an F_Port where there's only a single node at the end. If it's acting as an FL_Port, which has been predetermined, then it will decode the bit 0 to 7 of the D_ID, which is a loop number, which actually translates to a Fibre Channel AL_PA (Arbitrated Loop Physical Address). The port attempts to open a path from the FL Port itself to the loop node that matches the AL_PA, and once it does and a response comes back, then the path is available for transmitting the frame. Then the frame goes out to the loop.

Connectionless frame routing in a two-stage configuration is shown in FIGS. 9A and 9B. A two-stage configuration uses multiple chassis or boxes where each shares the same fabric ID, but each has a different chassis number (CN). The chassis or boxes are separate logically, even if they may be enclosed together in a single cabinet. Each chassis can have 16 or 64 channels, but for simplicity of the Figures, only a few ports are shown. The chassis on the left in FIG. 9A has been given the chassis number ID CN=0 by the microprocessor. The middle one is CN=1 and the right one is CN=2. Routing in this configuration uses bits 14–19 of the D_ID, which have the chassis number.

The various ports may have different types of devices or other chassis connected to them, and the microprocessor 80, 280 discovers the connected topology upon power-up, then programs the ports and addresses accordingly.

The ports of CN 0,1,3 above the Stage 2/Stage 1 dotted line in FIG. 9A are programmed as E_Ports, and are used to interconnect the chassis. The ports below the dotted line are programmed as F_Ports or FL_Ports, depending on whether a loop is connected.

In operation, the D_ID format of each frame is checked as it arrives at a chassis. The receiving ASIC 50 first looks at the fabric ID, and if there is not a match, the frame gets sent to the microprocessor to handle. If there is a match, then it routes according to the rest of the D_ID. If the D_ID chassis number is not equal to the CN for the receiving ASIC, then the frame will have to be routed to a different chassis. If D_ID chassis number is equal to the chip CN, then the ASIC (chip) number is checked for a match. If the chip number of the D_ID is the same as the chip number of the receiving chip, then routing can be completed by decoding bits 8–9 of the port number, just as in a single stage. If the chip number doesn't match, then it will search for the other chip using the connectionless back plane to find that other chip, which is denoted by 10–13. If no such chip number exists, the frame will be routed to the microprocessor as an error. Finally, the AL PA number 0–7 is handled exactly the same way as it was in a single stage.

Figure 7B:
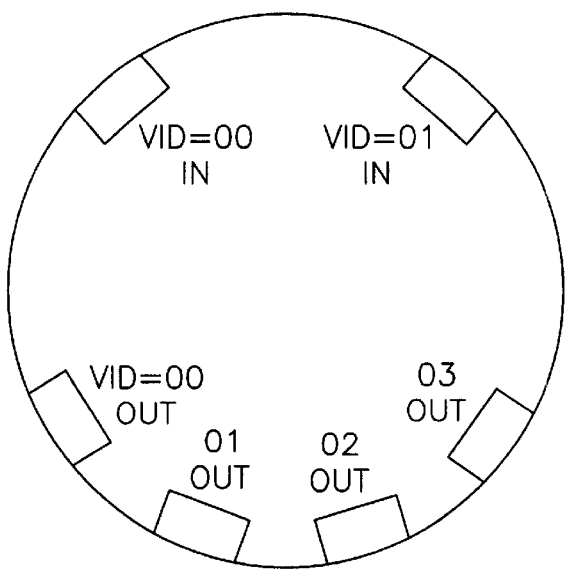

When the frame is received in an ASIC in stage one and the chassis number of the chip is not equal to the CN of the frame D_ID, then it must be routed to a different chassis. The E_Ports are used to access other chassis. The virtual IDs of the ports on the ASIC are used for this. The virtual IDs are indicated in FIG. 7B and are assigned by the microprocessor during topology discovery at startup. Each port is either an inbound an outbound virtual ID. The inbound direction refers to going further into the fabric, and outbound refers to heading for a final destination port. Every port in a chassis is assigned a 6-bit virtual ID along with a single bit that denotes whether the port is an inbound path or an outbound path. The virtual ID needs to be 6 bits because there can be a maximum of 64 ports in a chassis or box. For example, in the case of the two E_Ports of CN=0, the one connecting to CN=1 would have had a virtual ID of 01 inbound, and the E_Port connecting to CN=2 would have had a virtual ID of 02 inbound because it leads to chassis 2, and so on. Therefore when the frame arrives at an ASIC 50, and the chassis number doesn't match, the hardware takes the chassis number and puts it out on the frame bus as a virtual ID, and sets Inbound as a request. The ASIC containing the virtual/Inbound ID will respond with an ACK, and the frame will be transferred to that ASIC which will route the frame to the port that owns the virtual/Inbound ID.

Inbound virtual IDs are used in going from the stage-2 side toward the destination port. In the above example, a frame has moved from the receiving chassis CN=0 to the destination chassis CN=1, but it's on the stage-2 side, or receive side the chassis. From here the chassis can ignore the CN portion of the D_ID, and route to the port number using outbound virtual IDs. If applicable in a given frame, the AL_PA number bits 0–7 are used if the destination is a participating FL_Port.

Three-stage addressing is somewhat different, because there are stage 1, 2 and 3 chassis, and each stage role requires different programming for address handling. In FIG. 10A the lower chassis which serve as Stages 1 and 2 are numbered CN=0,1,2,3. There are no chassis numbers for the stage 3 chassis because they do not have destinations, but are interconnect chassis. Therefore they don't have a CN ID.

A frame coming into CN=0 will be checked to see if the destination CN=0. If so, the frame will route the same way as discussed above for 2-stage and 1-stage configurations. If the destination chassis number is different than the receiving chassis number, it will be sent to a stage-3 chassis. Because there is more than one stage-3 chassis (two are used in the example of FIG. 10A), a decision is needed as to which one to send it to. In the case of a 3-stage configuration, there is always a connection between every one of the chassis that have user ports on them and every one of the interconnect chassis. In other words, with reference to FIG. 10A, there are paths between every pair of stage 1 chassis through either stage 3 interconnect chassis. Because of this, a stage-1 chassis can forward a frame to another stage-1 chassis through either of its E_Ports take any E_Port path you can find to get to your destination chassis because all of them connect to each other.

After a frame has reached a stage 3 chassis, it can be routed to the destination chassis using the destination CN as the stage-3 outbound virtual ID. When the frame arrives at the stage 2 side of the destination chassis, it can be routed to the destination F or FL port in the same manner as described above for the one and two stage configurations.

The fact that any stage 3 chassis can be used for routing from one stage 1 chassis to another presents the opportunity to chose which stage 3 interconnect chassis to select in a given case. One possibility is to have a stage 2 select whichever of its E_Ports is not busy. In another embodiment a rotary count selector is used to alternate and spread the frames among E_Ports. A stage 2's E_Ports are numbered 1, 2, 3 etc. (Similar to virtual IDs but in this case not used for addressing, only for selecting). Any time that an ASIC is trying to move a frame towards one of these E_Ports, it checks a "rotary" counter to select the E_Port to used. The next such frame will be send to the next E_Port number, and so on as the counter is advanced. This techniques helps spread the load around and utilize the full bandwidth of the switch.

While the embodiment of FIG. 10A uses two stage-3 chassis, and four E_Ports on each, it will be appreciated that this is only one example. If it is necessary to increase performance, additional E_Port connections can be used, and additional stage-3 chassis can be used also. Either way there will be many more port connections between the chassis. If there is a 64-port chassis, there could be as many as 32 E_Ports , so this rotary count has to be able to express that. Therefore, a count of 0–31 can be programmed for this counter. During topology discovery the number of links is discovered by the microprocessor, and the count limit is set on where the counter wraps around back to the start.

Frame routing in a five-stage configuration is shown in FIGS. 11A and 11B. A five-stage configuration is very similar to the three-stage examples above, except that the AN (area number) field, bits 0–5 of the D_ID are used. An "area" is a broader concept than a chassis and refers to a collection, or area, of chassis. It is the next step up in scale from a chassis. The network of FIG. 11A has two stage-3/stage-4 chassis, numbered as AN=0 and AN=1. These are assigned on start-up topology discovery, and all the ASICs in the switch must have access to this information.

When a frame comes into a stage-1 port, the frame address is initially handled in the manner previously described. If it has the same FN, AN and CN as the receiving chassis, it is routed within the chassis to the destination port. If it has the same AN but a different CN, or a different AN, it is passed from stage 2 to a stage 3 chassis, in a manner similar to the above examples. Stage 3 now has to check not for the chassis number but for the area number. If the AN matches, then it'll route via the chassis number and get down to the correct chassis number within the same area. If the AN is not matched, then it routes up through stage 4 and up to stage 5 using the rotary count described previously. The stage 5 will simply route it by AN to get it to the proper area. Once down to the proper area, the frame will be routed by the stage 3 to the correct chassis, then to the correct destination port.

It will be appreciated that FIG. 11A is a simplified system with one stage 5 and two stage 3/4 chassis, and a pair of E_Port links at each interconnect. Higher bandwidth can be achieved with additional E_Port interconnects and/or with additional stage 3/4 chassis and stage 5 chassis. Port selection algorithms can be used as described above. Because the five-stage configuration uses bits 0–5 for the area number, it cannot support loops, which ordinarily use these bits.

The addressing techniques described above are illustrated by following how both Connection and Connectionless frames are routed through the fabric. Connection frames are the SOFi1 and SOFn1 types. Connectionless frames are the SOFi2, SOFn2, SOFi3, SOFn3, SOFc1 and SOFf types. Routing is accomplished by inspection of the frame SOF code, and in most cases, the frame Destination ID (D_ID field). SOFf frames are always routed directly from a link receiver to a microprocessor, or from a microprocessor directly to a link transmitter. Hence they are steered by virtue of the SOFf code, but not by the D_ID. SOFc1 frames are connectionless frames that are used to establish a dedicated full duplex connection service between two fabric ports, as the SOFc1 frame traverses the connectionless fabric between the source and destination fabric ports using the frame D_ID, setting up the connection fabric paths as it goes. When the SOFc1 successfully reaches the destination N_Port, the duplex connection path has been established and can be used, first by the SOFn1 acknowledgement frame from the destination N_Port to the source N_Port, then by both N_Ports for sending and receiving Class 1 transactions. Because the dedicated connection was set up previously, SOFi1 and SOFn1 frames do not have to be routed but simply follow the connection path by virtue of their SOFcodes (their D_ID fields are ignored).

Connectionless frames (SOFi2, SOFn2, SOFi3, SOFn3 and SOFc1) are routed through the connectionless fabric by inspection of their D_ID field. In all cases, if the Fabric ID (FID) does not match the fabric's native ID, the frame is not routable and will be sent to the nearest microprocessor for handling.

Each fabric port transmitter in a chassis is assigned a programmable 6-bit "Virtual ID" and a 1-bit Direction indicator denoting whether the port is an "inbound" or "outbound" link. An "inbound" link is one that leads deeper into the fabric, while an "outbound" links is one that leads out of the fabric. The Virtual ID has to be 6-bits because there can be up to 64 ports in a chassis. The Virtual ID can represent a port number (PN), a chassis number (CN), an area number (AN), or a Rotary Count. When representing PN, CN or AN, the Virtual ID indicates a pathout (outbound) of the fabric to the desired destination. When representing a Rotary Count, the Virtual ID indicates a path deeper (inbound) into the fabric. The Rotary Count is used to alternate and spread the frames among E_Ports. There can be anywhere from 1 to a maximum of 32 E_Ports between any two chassis pairs, so the rotary count is programmable from 0 to 31 during topology discovery. In use, the first time an Inbound E_Port is needed, the rotary count mechanism will yield a Virtual ID of 0. The second time an Inbound E_Port is needed the rotary count mechanism will yield a Virtual ID of 1, etc. When the rotary count uses the largest count programmed, it will roll over back to 0 and begin again. Virtual IDs, Directions, Rotary Counts, etc., are all programmed by a microprocessor as part of topology discovery, typically on powerup.

After the steering mechanism determines which chassis port is the intended destination, via the Virtual ID/Direction, the frame will be routed. If the Virtual ID/Direction is in the same ASIC that received the frame, the frame will be transferred to the fabric port so designated and then transmitted onto the link. If the Virtual ID/Direction is not on the same ASIC, it must be made to transfer to the appropriate ASIC within the chassis. To do this, the Virtual ID/Direction is presented as an address on the connectionless frame bus. All ASICs (up to 16 in a 64-channel chassis) see the request and address, and compare the address to each of the Virtual ID/Direction of the four ports that it serves. One ASIC will respond with an ACK, causing the frame to be transferred from the source ASIC to the destination ASIC (the one that ACKed). The destination ASIC will then transfer the frame to the fabric port so designated, for transmission on the link. If no ASIC responds with an ACK, the frame has no real destination and is transferred instead to the local microprocessor for handling as an exception.

Single-stage Connectionless routing proceeds as follows. A 1-Stage topology is a single box or chassis, and can provide up to 16 or 64 F/FL_Ports. The single-stage case is represented by the address of FIG. 8B and the topology of FIG. 8A. All the ASICs are programmed similarly in that they are all programmed with a common FID, but with different chip numbers. In this case, any time they see a frame coming into one of their ports, they first look at the FID part of the DID, to see whether it matches the native FID of this fabric. If there is no match, the frame cannot be routed by hardware, but will instead be routed to the nearest microprocessor for handling. The D_ID CN is field is ignored, but the D_ID PN field is used to as the Virtual ID. The chassis destination port will then be Virtual ID/Direction where Virtual ID=PN, and Direction= Outbound. If the destination is in the same ASIC, the transfer takes place within the same ASIC to the destination port denoted by bits 9:8 of the PN. If the destination is not in the same ASIC, the frame will use the frame bus to find the destination ASIC. The source ASIC presents Virtual ID/Direction called out above as an address on the frame bus. The ASIC that responds with an ACK to that address will have the frame transferred to it, and will route the frame to the destination port corresponding to the Virtual ID/Direction.

If the destination port is an FL_Port, than the AL_PA field of the D_ID will be used. In this case, once the frame gets down to the destination port, then that port has to decide whether it is implementing an FL_Port or an F_Port. If it is acting as an FL_Port, which has been predetermined, then it will decode the D_ID AL_PA, which is the Arbitrated Loop Physical Address, or the destination on the loop. The port will open a path from the FL_Port itself to the loop node that matches the AL_PA, and once it does that and has received a response coming back, then the path is available for transmitting the frame. Then the frame goes out to the loop. If the destination port is an F_Port, AL_PA is ignored.

Two-Stage Connectionless routing proceeds as follows. Two-stage topologies are used when more fabric ports are needed than can be provided by a 1-Stage. 2-Stage topologies can provide up to approximately 1000 F/FL_Ports. Connectionless frame routing in a two-stage configuration is shown in FIGS. 9A and 9B. A two-stage configuration uses multiple chassis, and each has the same FID, but a different CN. The chassis are logically separate, even if they may be enclosed together in a single cabinet. Each chassis can have 16 or 64 channels, but for simplicity of the Figures, only a few ports are shown. The chassis on the left in FIG. 9A has been given the chassis number ID CN=0 by the microprocessor. The middle one is CN=1 and the right one is CN=2. Routing between boxes in this configuration uses the CN field of the DID.

The various ports may have different types of devices or other chassis connected to them, and the microprocessor 80, 280 discovers the connected topology upon power-up, then programs the FID value, CN values, chip values, and the ports' Virtual ID/Direction values accordingly.

The ports above the Stage 2/Stage 1 dotted line in FIG. 9A are programmed as E_Ports, and are used to interconnect the chassis. The ports below the dotted line are programmed as F_Ports or FL_Ports, depending on whether a loop is connected. The Stage 1 ports have their Virtual ID/Direction programmed to PN/Outbound, where PN would be equal to 0, 1, 2 and 3 respectively for the 4 Stage 1 ports shown. The Stage 2 E_Ports have their Virtual ID/Direction set to CN/Inbound, where CN would be equal to the chassis at the other end of the link. In the case of chassis 0 E_Ports, the right Stage 2 port Virtual ID is programmed to 1, since it leads to chassis 1, and the left Stage 2 port is programmed to 2, since it leads to chassis 2.

In operation, the D_ID format of each frame is checked as it arrives at a F/FL_Port. The receiving ASIC 50 first looks at the FID field, and if there is not a match with the chip FID, the frame gets sent to the microprocessor to handle. If there is a match, the receiving ASIC 50 inspects the D_ID CN field. If D_ID CN is equal to the chip CN, then the ASIC (chip) number is checked for a chip match, which is denoted by D_ID PN bits 10–13. If the chip number of the D_ID is the same as the chip number of the receiving chip, then routing can be completed by decoding PN bits 8–9 just as in a single stage. If the chip number does not match, then it will search for the destination chip using the connectionless backplane to find that other chip, which is denoted by Virtual ID/Direction equal to PN/Outbound, where PN=D_ID PN. If no other chip responds, the frame will be routed to the microprocessor as an error.

In the case where the D_ID CN did not match the chip CN, it must be routed to a different chassis. The Stage 2 E_Ports are used for this. If the D_ID CN value denotes chassis 1, the frame will be routed using CN/Inbound where CN=1, which would use the leftmost stage 1 link. If the D_ID CN value denotes chassis 2, the frame will be routed using CN/Inbound where CN=2, which would use the rightmost stage 1 link.

When the same frame is received at the destination chassis stage 2 link receiver, it will route to the destination port using Virtual ID/Direction=PN/Outbound. Finally, the AL_PA is handled at the destination port exactly the same way as it was in a single stage. If the D_ID CN value denotes a chassis that does not exist, there will be no response to the backplane query, and the frame will be routed to the microprocessor 80, 280 for handling.

The example above considered the case of three chassis connected in a 2-stage topology as shown, but it should be appreciated that this is only an example, that more chassis can be configured in 2-stage topologies.

Three-Stage Connectionless routing proceeds as follows. 3-Stage topologies re used when either more ports are required, or more interconnect bandwidth is required, than can be provided by a 2-Stage topology. 3-Stage topologies can provide up to 4096 fabric ports (minus those used for E_Ports).

Connectionless frame routing in a three-stage configuration is shown in FIGS. 10A and 10B. Three-stage addressing is somewhat different than two-stage, because there are additional chassis that are used solely for interconnecting chassis that have fabric ports. These chassis are referred to as Stage 3 chassis, and contain only E_Ports (no fabric ports). Because they do not contain fabric ports, they do not have native FID, CN or PN values. 3-Stage rules require that there be an operational link between every Stage 3 chassis, and every Stage 1/2 chassis, so that any frame seeking a different destination CN can use any Stage 3 chassis to reach that CN. Stage 3 chassis are reached by using the Rotary mechanism described earlier. Stages 1, 2 and 3 each requires different programming for frame routing, which is programmed at topology discovery. In FIG. 10A the lower chassis which serve as Stages 1 and 2 all have the same FID, but have different CNs, and are programmed with CN=0,1, 2,3. There are no chassis numbers for the stage 3 chassis because they contain only E_Ports, and are used only as interconnect chassis. The Stage 1 ports have their Virtual ID/Direction programmed to PN/Outbound, where PN would be equal to 0, 1, 2 and 3 from left to right. The Stage 2 E_Ports have their Virtual ID/Direction set to Rotary/ Inbound, where Rotary is equal to 0 and 1 from left to right, which will be identical for all four chassis of that type. The Stage 3 E_Ports would be programmed to CN/Outbound where CN would be equal to 0, 1, 2 and 3 from left to right, which identifies which chassis they lead to, and which will be identical for both chassis of that type.

Consider the case of a frame arriving in chassis 0. The handling of FID is as described earlier. If D_ID CN matches the chip CN, the frame will route to the F/FL_Port denoted by PN/Outbound, whether on the same chip or a different chip in the same chassis, as described earlier. If D_ID CN does not match the chip CN, it is free to route to either of the two interconnect chassis, as either will lead to the destination chassis. The frame will route to the Stage 2 E_Port designated by Rotary/Inbound, where the rotary value is selected by the rotary mechanism. When the frame is received in the interconnect chassis stage 3 E_Port, it will be routed to the stage 3 E_Port designated by CN/Outbound, where CN is equal to the D_ID CN. When the frame arrives in the Stage 2 E_Port, it will be routed to the F/FL_Port designated by PN/Outbound, where PN is equal to the D_ID PN. Finally, the AL_PA is handled at the destination port exactly the same way as it was in a single stage.

5-Stage Connectionless routing proceeds as follows. The 5-Stage concept expands the number of fabric ports that can be provided from 4096 (minus those used as E_Ports) in a 3-Stage topology, to 260,416 (minus those used as E_Ports). 5-Stage uses Stage 4 and Stage 5 as the routes between Areas. Stage 4/5 paths are functionally equivalent to Stage 2/3 paths, in that they use rotary counts to route inbound, but use AN values rather than CN values to route outbound. Frame routing in a five-stage configuration is shown in FIGS. 11A and 11B. A five-stage configuration is very similar to the three-stage examples above, except that the AN (area number) field, bits 0–5 of the D_ID are used in addition to CN and PN. An "area" is a broader concept than a chassis, and refers to a collection of chassis in an area. It allows up to 64 areas, each containing 64 user chassis arranged in 3-stage topologies.

Stages 1, 2, 3, 4 and 5 each requires different programming for frame routing, which is programmed at topology discovery. In FIG. 11A, two areas are shown, each area within a dotted rectangle. The leftmost area is designated AN=0, and the rightmost AN=1. Within an area, Stages 1 and 2 are programmed with FID, AN, CN and chip numbers. Stages 3 and 4 are programmed with AN. Stage 5 has no native IDs.

The Stage 1 F/FL_Ports have their Virtual ID/Direction programmed to PN/Outbound, where PN would be equal to 0, 1, 2 and 3 from left to right. The Stage 2 E_Ports have their Virtual ID/Direction set to Rotary/Inbound, where Rotary is equal to 0 and 1 from left to right,which will be identical for all four chassis of that type. The Stage 3 E_Ports have their Virtual ID/Direction programmed to CN/Outbound where CN would be equal to 0 and 3 from left to right, which identifies which chassis they lead to, and which will be identical for both chassis of that type. The Stage 4 E_Ports have their Virtual ID/Direction programmed with Rotary/Inbound. The Stage 5 E_Ports have their Virtual ID/Direction programmed with AN/Outbound.

Consider the case of a frame arriving in chassis 0. The handling of FID is as described earlier. If D_ID AN matches the chip AN, and CN matches the chip CN, the frame will route to the F/FL_Port denoted by PN/Outbound, whether on the same chip or a different chip in the same chassis, as described earlier. If D_ID AN or CN does not match the chip AN or CN, the frame will route to Stage 2 E_Port designated by Rotary/Inbound, where the rotary value is selected by the rotary mechanism. When the frame is received in the stage 3 E_Port, it must be determined if the frame destination is within the same area or not. If the D_ID AN matches the chip AN, the frame will be routed to the stage 3 E_Port designated by CN/Outbound, where CN is the D_ID CN. If the D_ID AN does not match the chip AN, the frame will be routed to the stage 4 E_Port designated by Rotary/Inbound, where rotary value is selected by the rotary mechanism. When the frame arrives in the Stage 5 E_Port, it will be routed to the port designated by AN/Outbound, where AN is equal to the D_ID AN. In all cases, when a frame arrives in a Stage 4 E_Port,it is routed by CN/Outbound, and when a frame arrives in a Stage 2 E_Port, it is routed by PN/Outbound.

It is to be understood that the above description is intended to be illustrative, and not restrictive. Many other embodiments will be apparent to those of skill in the art upon reviewing the above description. The scope of the invention should therefore be determined with reference to the appended claims, along with the full scope of equivalents to which such claims are entitled.

| Glossary of Fibre Channel terms | |
| --- | --- |
| FC-PH | An ANSI X3.T11 Fibre Channel specification for Fibre Channel Physical and Signaling Interface. This can be a range of documents labeled FC-PH, FC-PH-2, FC-PH-3, etc. |
| FC-AL | An ANSI X3.T11 Fibre Channel specification for Fibre Channel Arbitrated Loop. This can be a range of documents labeled FC-AL, FC-AC-2, etc. |
| FC-SW | An ANSI X3.T11 Fibre Channel specification for Fibre Channel Switch Fabric. This can be a range of documents labeled FC-SW, FC-SW-2, etc. |
| Connection | Described in FC-PH, this is a general class of service implemented in fabrics as a sub-fabric, providing dedicated connections between fabric ports. It is usually a high-latency, guaranteed high bandwidth path. Class 1 is a connection service. |
| Connectionless | Described in FC-PH, this is a general class of service implemented in fabrics as a sub-fabric, providing non-dedicated paths between fabric ports. It is usually a low-latency, low-bandwidth path. Class 2 and Class 3 are connectionless services. |
| Class 1 | Described in FC-PH, this is a connection service utilizing the connection sub-fabric. It utilized dedicated duplex or dedicated simplex connections between one fabric port and another. Class 1 Start-Of-Frame codes are SOFc1, SOFi1 and SOFn1, which steer the frame upon entry to the fabric into the connection sub-fabric. |
| Class 2 | Described in FC-PH, this is an acknowledged connectionless service utilizing the connectionless sub-fabric. It utilizes a store-and-forward packet switch between one fabric port and another. Class 2 Start-Of-Frame codes are SOFi2 and SOFn2, which steer the frames upon entry to the fabric into the connection sub-fabric. |

-continued

| Glossary of Fibre Channel terms | |
|---|---|
| Class 3 | Described in FC-PH, this is a non-acknowledged connectionless service utilizing the connectionless sub-fabric. It utilizes a store-and-forward packet switch between one fabric port and another. Class 3 Start-Of-Frame codes are SOFi3 and SOFn3, which steer the frames upon entry into the connection sub-fabric. |
| Intermix | Described in FC-PH, this is a service where connection and connectionless frames can be intermixed on the same Fibre Channel port or link. When Intermix is occurring, the Class 1 connection service is still guaranteed the maximum specified bandwidth. |
| Fabric port | This is a generic term for a fabric port that can function as one or more of the following: F_Port, FL_Port, E_Port. |
| F_Port | Described in FC_PH, this is a fabric port that attaches to one N_Port. This port gives the N_Port access to the switch for initialization and login, and it provides paths to the internal fabric for passing frames to other nodes. |
| FL_Port | Described in FC_AL, this is a fabric port that attaches to one or more NL_Ports. This port gives the N_Ports access to the switch for initialization and log in, and it provides paths to the internal fabric for passing frames to other nodes. It also is the loop master for initialization and control. |
| E_Port | Described in FC-SW, this is a fabric port that provides a link or connection between one switch chassis to another switch chassis. This port can handle connections to switch chassis made by the manufacturer, or to switch chassis made by different manufacturers. |
| N_Port | Described in FC-PH, an N_Port is a Node Port which is a port into and out of a single processing entity, that can source and sink FC frames from other N_Ports or NL_Ports through the FC fabric. There is one and only one N_Port connected to each FL_Port. |
| NL_Port | Described in FC-AL, an NL_Port is a Node Loop Port which is a port into and out of a single processing entity, that can source and sink FC frames from other N_Ports or NL_Ports through the FC fabric. An FL_Port can support 1–126 NL_Ports arranged in loop fashion. |
| SOFc1 | Described in FC-PH, this is a start of frame (SOF) code identifying a class 1 connect request frame. This is used by an N_Port of NL_Port to request a dedicated guaranteed bandwidth path between itself and another N_Port or NL_Port. |
| SOFi1 | Described in FC-PH, this is a start of frame code identifying the initial class 1 data frame of a sequence of frames that will traverse a dedicated class 1 connection set up by an SOFc1 frame. |
| SOFn1 | Described in FC-Ph, this is a start of frame code identifying a continuation class 1 data frame of a sequence of frames that will traverse a dedicated class 1 connection set up by an SOFc1 frame. |
| SOFi2 | Described in FC-PH, this is a start of frame code identifying the initial Class 2 data frame of a sequence of frames. This class of service uses the connectionless sub-fabric which is a low latency low bandwidth time-multiplexed fabric. Class 2 sequences are acknowledged sequences. |
| SOFn2 | Described in FC-PH, this is a start of frame code identifying a continuation Class 2 data frame of a sequence of frames. |
| SOFi3 | Described in FC-PH, this is a start of frame code identifying the initial Class 3 data frame of a sequence of frames. This class of service uses the connectionless sub-fabric which is a low latency low bandwidth time-multiplexed fabric. Class 3 sequences are not acknowledged. |
| SOFn3 | Described in FC-PH, this is a start of frame code identifying a continuation Class 3 data frame of a sequence of frames. |
| SOFf | Described in FC-PH, this is a start of frame code identifying an internal fabric frame. These frames allow multiple fabric computers, state machines, chassis, or different manufacturer's chassis to communicate with each other in order to manage the fabric. |

| Glossary of Device Terms | |
|---|---|
| Chassis | A physical device that embodies an entire Fibre Channel switched fabric implementation, or can be linked to other chassis for the purpose of expanding the fabric. A chassis typically has 8–64 fabric ports, where each port may be capable of being an F_Port, an FL_Port or an E_Port. |
| One stage | A topology containing exactly one switch chassis with user ports each of which may be an F_Port, FL_Port or E_Port. The fabric port addressing range is 64, which provides exactly 16 |

-continued

| Glossary of Device Terms | |
|---|---|
| | user ports when a 16-port chassis is used, and 64 user ports when a 64-port chassis is used. |
| Two stage | A topology containing multiple switch chassis where some fabric ports are E_Ports to allow expansion to one-hop systems providing more user ports than a one-stage can provide.<br>The fabric port addressing range is 4096, although far fewer ports are actually implemented. A two stage made up of 16-port chassis typically provides 24 user fabrics ports when four ports in each chassis are E_Ports; however, the maximum would be 72 user ports when using 9 chassis of 8 user ports each and one link between each chassis. A two stage made up of 64-port chassis typically provides 96 user ports when 16 ports in each chassis are E_Ports; however, the maximum would be 1026 user ports when using 33 chassis of 32 user ports each, and one link between each chassis. Other combinations are possible. The number of links between chassis, hence the amount of available bandwidth between chassis is determined by system requirements. |
| Three stage | A topology containing multiple switch chassis where some fabric ports are E_Ports to allow expansion to one or more separate chassis that provide only cross-connect functionality. This provides an expansion method for providing more user ports than one or two-stage systems can provide.<br>The number of cross-connect chassis, and the number of E_Ports between chassis, is a function of system performance requirements. A system made up of 16-port chassis can provide up 128 user ports with 100% non-blocking, or 192 user ports with 33% non-blocking. A system made up of 64-port chassis can provide up 2048 user ports with 100% non-blocking, or 3072 user ports with 33% non-blocking. |
| Five stage | A topology containing multiple switch chassis where some fabric ports are E_Ports to allow expansion to a separate chassis or chassis that provide only cross-connect functionality. In this topology, there are two levels of cross-connect chassis to provide more addressing range. This provides an expansion method for providing more user ports than one, two or three-stage systems can provide.<br>The number of cross-connect chassis, and the number of E_Ports between chassis, is a function of system performance requirements. A system made up of 64-port chassis can provide up 131,072 user ports with 100% non-blocking, or 196,608 user ports with 33% non-blocking. Although it's possible to make a five-stage out of 16-port chassis, it is more logical to use 3-stage 64-port chassis, and so the five-stage 16-port version is not considered here. |
| Blocking | This is a measure of available bandwidth in a fabric. If a frame received at a fabric port is impeded in movement to the destination fabric port for any reason other than the destination fabric port is busy, then blocking internal to the fabric is occurring. This is usually a function of the aggregate bandwidth available between the source and destination fabric ports. Aggregate bandwidth is a function of the number of paths and the transmission rate of the paths between source and destination fabric ports.<br>If the aggregate fabric bandwidth is equal to the aggregate fabric port bandwidth, it would be said that this is 100% non-blocking, or 0% blocking. If the aggregate fabric bandwidth is 1/3 of the aggregate port bandwidth, this would be 33% non-blocking, or 66% blocking. Note that actual blocking is a function of the amount and type of frame traffic in a system under load. If a system is theoretically 66% blocking, but traffic is such that the bandwidth is sufficient to handle that traffic without blocking, the system effectively is non-blocking. Note also that for Fibre Channel fabrics that implement both the connectionless and connection sub-fabrics, there are two blocking FIGS., one for each sub-fabric. In this architecture, the connection sub-fabric is always 100% non-blocking, and the connectionless sub-fabric is a function of locality of reference, and can vary from 25–100% non-blocking. The total available bandwidth is the sum of both connection and connectionless, so this architecture always provides aggregate bandwidth > aggregate fabric port bandwidth, regardless of topology or locality of reference, provided both connection and connectionless classes of service are used. |
| Stage 1 | The only stage of a one-stage system, and the first stage of two, three or five-stage systems. |
| Stage 2 | The second stage of a two, three or five-stage system, used to aggregate stage 1s. |
| Stage 3 | The third stage of a three or five-stage system, used to aggregate stage 1s. |
| Stage 4 | The fourth stage of a five-stage system, used to aggregate stage 1s. |
| Stage 5 | The fifth stage of a five-stage system, used to aggregate stage 1s. |

What is claimed is:

1. A switch network, comprising:

a plurality of switch chassis having a plurality of ports capable of functioning as input ports, destination ports or interconnect ports;

data connections for connecting some of the ports of the chassis as interconnect ports between chassis, and other ports as input or destination ports for data to be transmitted through the switch network;

each switch chassis having a space division switch capable of selectively interconnecting selected ones of its ports for data transfer;

each switch chassis having a time division switch for selectively transmitting data frames or packets between selected ones of its ports;

each of said ports having address decode logic operative in response to receipt of a frame of data at the port to decode an address portion of said frame;

said ports operative in response to the address for a data frame for time division switching to transmit the frame on said time division switch to a destination port on the receiving chassis or to an interconnect port for a destination port on a chassis different from the receiving port chassis based on the destination address of the frame;

said ports operative in response to a frame requesting a space division switch connection to transmit the frame on said time division switch to a destination port for the requested space division switch connection on the receiving chassis or to an interconnect port for a destination port on a chassis different from the receiving port chassis based on the request address of the frame; and said ports operative in response to the transmission of the space division switch request frame through the switch network to cause the space division switch of the receiving, destination and any interconnect chassis to establish a space connection between the receiving and destination ports for the transmission of data.

2. A network according to claim 1 wherein two substantially identical switch chassis are connected in a two-stage topology, with one or more of their ports connecting to each other as the second stage interconnect ports, and with of the ports of the two chassis connectable as first stage input/destination ports.

3. A network according to claim 1 wherein three substantially identical switch chassis are connected in a three-stage topology, with a plurality of the ports of two of the chassis connectable as first stage input/destination ports, wherein said two chassis have one or more ports connected as stage two interconnect ports to interconnect ports on the third of said chassis which operate as the stage three interconnect ports.

4. A network according to claim 1 wherein a plurality of substantially identical switch chassis are connected in a five-stage topology, wherein:

with a number of chassis have a plurality of ports connectable as first stage input/destination ports, and at least one port connected as a stage two interconnect port;

a number of said chassis connected with two or more ports connected as stage three interconnect ports to the stage two interconnect ports, and having at least one of their ports connected as stage four interconnect ports; and at least one of said chassis having a plurality of ports connected as stage five interconnect ports connected to the stage four interconnect ports.

5. A switch network for handling Fibre Channel data, comprising:

a plurality of switch chassis having a plurality of ports capable of functioning as N_Ports or E_Ports;

data connections for connecting some of the ports of the chassis as E_ports for interconnection between chassis, and other ports as N_Port input and/or destination ports for data to be transmitted through the switch network;

each switch chassis having a connection switch capable of selectively interconnecting selected ones of its ports for Class 1 data transfer;

each switch chassis having a connectionless switch for selectively transmitting Class 2 or 3 data frames between selected ones of its ports;

each of said ports having address decode logic operative in response to receipt of a frame of data at the port to decode an address portion of said frame;

said ports operative in response to the address for a data frame for connectionless switching to transmit the frame on said connectionless switch to a destination port on the receiving chassis or to an interconnect port for a destination port on a chassis different from the receiving port chassis based on the destination address of the frame;

said ports operative in response to a frame requesting a Class 1 connection to transmit the request frame on said t connectionless switch to a destination port for the requested Class 1 connection on the receiving chassis or to an interconnect port for a destination port on a chassis different from the receiving port chassis based on the request address of the frame; and said ports operative in response to the transmission of the Class 1 request frame through the switch network to cause the connection switch of the receiving, destination and any interconnect chassis to establish a Class 1 data connection between the receiving and destination ports for the transmission of data.

6. A switch network according to claim 5, wherein at least some of the ports of the chassis are capable of functioning as FL_Ports when connected to a loop.

7. A network according to claim 5 wherein two substantially identical switch chassis are connected in a two-stage topology, with one or more of their ports connecting to each other as the second stage interconnect E_Ports, and with of the ports of the two chassis connectable as first stage input/destination N_Ports.

8. A network according to claim 5 wherein three substantially identical switch chassis are connected in a three-stage topology, with a plurality of the ports of two of the chassis connectable as first stage input/destination N_Ports, wherein said two chassis have one or more ports connected as stage two interconnect E_Ports to interconnect E_Ports on the third of said chassis which operate as the stage three interconnect ports.

9. A network according to claim 5 wherein a plurality of substantially identical switch chassis are connected in a five-stage topology, wherein:

with a number of chassis have a plurality of ports connectable as first stage input/destination N_Ports, and at least one port connected as a stage two interconnect E_Port;

a number of said chassis connected with two or more ports connected as stage three interconnect E_Ports to the stage two interconnect E_Ports, and having at least one of their ports connected as stage four interconnect E_Ports; and at least one of said chassis having a plurality of ports connected as stage five interconnect E_Ports connected to the stage four interconnect E_Ports.

10. A switch chassis for providing selective data communication between lines or devices connectable thereto, comprising:

a plurality of ports capable of functioning as input ports, destination ports or interconnect ports for connection to another of such chassis;

a space division switch capable of selectively interconnecting selected ones of its ports for data transfer;

a time division switch for selectively transmitting data frames or packets between selected ones of its ports;

each of said ports having address decode logic operative in response to receipt of a frame of data at the port to decode an address portion of said frame;

said ports operative in response to the address for a data frame for time division switching to transmit the frame on said time division switch to a destination port on the receiving chassis or to an interconnect port for a destination port not on the chassis based on the destination address of the frame;

said ports operative in response to a frame requesting a space division switch connection to transmit the frame on said time division switch to a destination port for the requested space division switch connection on the chassis or to an interconnect port for a destination port not on the chassis based on the request address of the frame; and said ports operative in response to the transmission of the space division switch request frame through the switch chassis to its destination to cause the space division switch of the chassis to establish a space connection between the input and destination or interconnection ports for the transmission of data.

11. A switch chassis according to claim 10 wherein at least some of the ports of the chassis are capable of functioning as controller when connected to a loop of addressable devices.

12. A switch network comprising a plurality of the switch chassis of claim 10 connected together by their interconnected by their interconnect ports.

13. A switch chassis for handling Fibre Channel data, comprising:

a plurality of ports capable of functioning as N_Ports or E_Ports;

a connection switch capable of selectively interconnecting selected ones of its ports for Class 1 data transfer;

a connectionless switch for selectively transmitting Class 2 or 3 data frames between selected ones of its ports;

each of said ports having address decode logic operative in response to receipt of a frame of data at the port to decode an address portion of said frame;

said ports operative in response to the address for a data frame for connectionless switching to transmit the frame on said connectionless switch to a destination port on the chassis or to an interconnect E_Port for a destination port not on the chassis based on the destination address of the frame;

said ports operative in response to a frame requesting a Class 1 connection to transmit the request frame on said connectionless switch to a destination port for the requested Class 1 connection on the chassis or to an interconnect E_Port for a destination port not on the chassis based on the request address of the frame; and said ports operative in response to the transmission of the Class 1 request frame through the switch chassis to its destination to cause the connection switch to establish a Class 1 connection between the input and destination or interconnection ports for the transmission of data.

14. A switch chassis according to claim 13 wherein at least some of the ports of the chassis are capable of functioning as FL_Ports when connected to a Fibre Channel arbitrated loop.

15. A switch network comprising a plurality of the switch chassis of claim 13 connected together by their interconnected by their interconnect E_Ports.

16. A switch network according to claim 15 further including a programmed controller connected in communication with the ports and operative in a topology discovery mode to determine the type of Fibre Channel port each will be functioning as according to the network connection.

17. A switch network according to claim 16 wherein said ports are programmable by said programmed controller according to the port's topological address in the switch network.

18. A switch network according to claim 17 wherein the port address decoder logic selects destination paths based on said programmed topological addresses.

* * * * *

UNITED STATES PATENT AND TRADEMARK OFFICE
CERTIFICATE OF CORRECTION

PATENT NO.   : 6,597,691 B1
DATED        : July 22, 2003
INVENTOR(S)  : Terry M. Anderson and William R. George It is certified that error appears in the above-identified patent and that said Letters Patent is hereby corrected as shown below:

<u>Column 3,</u>
Line 35, delete "(SOFi1) and SOFn1)" and insert -- (SOFi1 and SOFn1) --.

<u>Column 5,</u>
Line 20, insert -- ≠ -- before "00hex".

<u>Column 7,</u>
Line 16, delete "a" after "has".

<u>Column 11,</u>
Line 64, delete "AL PA" and insert -- AL_PA -- therefor.

<u>Column 15,</u>
Line 10, delete "is" after "CN".
Line 48, delete "DID" and insert -- D_ID -- therefor.

<u>Column 16,</u>
Line 34, delete "re" and insert -- are -- therefor.

Signed and Sealed this

Third Day of February, 2004

JON W. DUDAS
*Acting Director of the United States Patent and Trademark Office*